US011038973B2

United States Patent
Sundin et al.

(10) Patent No.: US 11,038,973 B2
(45) Date of Patent: Jun. 15, 2021

(54) CONTACT EVENT FEEDS AND ACTIVITY UPDATES

(71) Applicant: Dropbox, Inc., San Francisco, CA (US)

(72) Inventors: Nicholas Sundin, San Francisco, CA (US); Matthew Valentine, San Francisco, CA (US); Parker Wilf, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 5 days.

(21) Appl. No.: 15/788,593

(22) Filed: Oct. 19, 2017

(65) Prior Publication Data

US 2019/0124169 A1 Apr. 25, 2019

(51) Int. Cl.
*G06Q 10/10* (2012.01)
*G06F 3/0482* (2013.01)
(Continued)

(52) U.S. Cl.
CPC .......... *H04L 67/22* (2013.01); *G06F 21/6218* (2013.01); *G06Q 10/101* (2013.01); *G06F 3/0482* (2013.01); *G06F 3/04817* (2013.01)

(58) Field of Classification Search
CPC ............... G06F 3/0484; G06F 3/04817; G06F 17/30867; G06F 17/30554; G06F 21/00;
(Continued)

(56) References Cited

U.S. PATENT DOCUMENTS 5,883,986 A 3/1999 Kopec et al.
6,675,355 B1 1/2004 Demopoulos et al.
(Continued)

FOREIGN PATENT DOCUMENTS

| JP | 2002091818 A | 3/2002 |
| JP | 2005129018 A | 5/2005 |
| WO | WO-2014100782 A1 | 6/2014 |

OTHER PUBLICATIONS

A. Sabbir et al., "Concurrency Control Frameworks for Interactive Sharing of Data Spaces in Real-time Distributed Collaborations," DS-RT 2005 Proceedings. Ninth IEEE International Symposium on Distributed Simulation and Real-Time Applications Electrical Contacts, p. 16-24, 2005.
(Continued)

*Primary Examiner* — Jennifer N To
*Assistant Examiner* — Qi Wan
(74) *Attorney, Agent, or Firm* — Polsinelli PC

(57) ABSTRACT

In some examples, a system can identify a plurality of contacts associated with a user account on a collaborative content management system, the plurality of contacts being associated with user accounts on the collaborative content management system. The system can obtain activity data associated with the plurality of contacts, the activity data identifying content interaction events at the collaborative content management system. Based on the activity data, the system can identify a portion of the content interaction events associated with one or more content items accessible to the user account and provide, to a user interface on a client device associated with the user account, a contact activity feed identifying the portion of the content interaction events and respective contacts associated with the portion of the content interaction events.

23 Claims, 11 Drawing Sheets

(51) Int. Cl.
   *H04L 29/08*     (2006.01)
   *G06F 21/62*     (2013.01)
   *G06F 3/0481*    (2013.01)
(58) Field of Classification Search
   CPC ........ G06F 3/048; G06Q 10/10; G06Q 10/00;
                                                H04L 67/00
   See application file for complete search history.

(56)                   References Cited

U.S. PATENT DOCUMENTS

| | | | |
|---|---|---|---|
| 7,043,566 B1* | 5/2006 | Grant | H04L 67/22 |
| | | | 719/318 |
| 7,496,886 B2 | 2/2009 | Puttaswamy et al. | |
| 8,380,796 B2 | 2/2013 | Robertson et al. | |
| 8,498,994 B2 | 7/2013 | Prabaker et al. | |
| 8,826,147 B2 | 9/2014 | Sitrick et al. | |
| 8,856,132 B2 | 10/2014 | Harischandrakar et al. | |
| 9,087,320 B2 | 7/2015 | Goldman et al. | |
| 9,189,756 B2 | 11/2015 | Gilbert et al. | |
| 9,189,770 B2 | 11/2015 | Greene et al. | |
| 9,275,161 B2 | 3/2016 | Kass et al. | |
| 9,531,652 B2 | 12/2016 | DeBenedictis et al. | |
| 2003/0069893 A1* | 4/2003 | Kanai | G06F 16/58 |
| 2006/0050312 A1 | 3/2006 | Takiyama et al. | |
| 2006/0085477 A1 | 4/2006 | Phillips et al. | |
| 2006/0193518 A1 | 8/2006 | Dong et al. | |
| 2007/0162432 A1* | 7/2007 | Armstrong | G06F 17/30867 |
| 2008/0005235 A1* | 1/2008 | Hegde | G06Q 10/10 |
| | | | 709/204 |
| 2008/0189399 A1* | 8/2008 | Quoc | G06Q 10/10 |
| | | | 709/223 |
| 2009/0259441 A1* | 10/2009 | Yoshikai | G06Q 10/10 |
| | | | 703/1 |
| 2009/0327305 A1 | 12/2009 | Roberts et al. | |
| 2011/0035323 A1* | 2/2011 | Hamilton | G06Q 10/06 |
| | | | 705/301 |
| 2011/0047484 A1* | 2/2011 | Mount | G06Q 10/10 |
| | | | 715/753 |
| 2011/0078191 A1 | 3/2011 | Ragnet et al. | |
| 2012/0063367 A1* | 3/2012 | Curtis | G06Q 30/0251 |
| | | | 370/270 |
| 2012/0110445 A1 | 5/2012 | Greenspan et al. | |
| 2012/0192086 A1* | 7/2012 | Ghods | G06Q 10/10 |
| | | | 715/753 |
| 2013/0036369 A1* | 2/2013 | Mitchell | G06Q 50/00 |
| | | | 715/753 |
| 2013/0185252 A1 | 7/2013 | Palmucci et al. | |
| 2013/0262420 A1 | 10/2013 | Edelstein et al. | |
| 2014/0055400 A1 | 2/2014 | Reuschel | |
| 2014/0089306 A1* | 3/2014 | Rana | G06F 17/30554 |
| | | | 707/731 |
| 2014/0164255 A1* | 6/2014 | Daly | G06Q 50/188 |
| | | | 705/80 |
| 2014/0258350 A1 | 9/2014 | Duval et al. | |
| 2015/0007055 A1* | 1/2015 | Lemus | G06F 3/0484 |
| | | | 715/753 |
| 2015/0134693 A1* | 5/2015 | Chan | H04L 65/403 |
| | | | 707/769 |
| 2015/0324381 A1* | 11/2015 | Brand | G06F 17/30088 |
| | | | 707/829 |
| 2016/0057154 A1* | 2/2016 | Ferguson | H04L 63/104 |
| | | | 726/7 |
| 2016/0063321 A1 | 3/2016 | Reese et al. | |
| 2016/0110403 A1 | 4/2016 | Lomet et al. | |
| 2016/0314318 A1 | 10/2016 | Li et al. | |
| 2017/0090704 A1* | 3/2017 | Hu | G06F 3/0484 |
| 2017/0139550 A1* | 5/2017 | Milvaney | G06F 3/04817 |
| 2017/0177182 A1* | 6/2017 | Wong | G06F 3/0484 |
| 2017/0177965 A1 | 6/2017 | Gordo et al. | |
| 2018/0046816 A1* | 2/2018 | Chanda | G06Q 10/107 |
| 2019/0108271 A1* | 4/2019 | Vikramaratne | G06Q 10/101 |

OTHER PUBLICATIONS

Fleishman G., "Best Online Storage Services for Small Businesses," PCWorld, Apr. 12, 2011, retrieved from http://www.pcworld.com/article/224905/online_storage_for_businesses.html on Aug. 19, 2014, 3 pages.

Garfinkel L.S., "Automating Disk Forensic Processing With SleuthKit, XML, and Python," Systematic Approaches To Digital Forensic Engineering, SAD FE 2009, Fourth International IEEE Workshop, May 21, 2009, 12 pages.

International Search Report and Written Opinion for PCT Application No. PCT/US2014/039707 dated Oct. 9, 2014, 13 pages.

International Search Report and Written Opinion for PCT Application No. PCT/US2018/048011 dated Jul. 11, 2018, 11 pages.

Sugarsync, "Sharing a Folder," XP002728686, retrieved from: https://web.archive.org/web/20120504090157/http://www.sugarsync.com/online-help/Sharing Folders.htm, Aug. 19, 2014, 1 page.

Aionaaka N.H., "Motivating Language And Empathic Leadership Drives Aircraft Readiness," Calhoun: The NPS Institutional Archive DSpace Repository, Mar. 2017, 59 pages.

Ryan, "What are Collaboration Folders and How do I use them?," Aug. 15, 2011, Support.box.com, retrieved from https://web.archive.org/web/20130425025610/https://support.box.com/entries/20358617-What-are-Collaboration-Folders-and-how-do-I-use-them-, Sep. 15, 2014, 1 page.

Bijalwan D.C., et al., "Automatic Text Recognition in Natural Scene and its Translation into User Defined Language," 2014 International Conference on Parallel, Distributed and Grid Computing (PDGC), IEEE, Dec. 11, 2014, pp. 324-329.

Herlihy M.P., et al., "Linearizability: A Correctness Condition for Concurrent Objects," ACM Transactions on Programming Languages and Systems, vol. 12 (3), Jul. 1990, pp. 463-492.

Kaur D., et al., "Machine Printed Gurumukhi Numerals Recognition using Convolutional Neural Networks," International Research Journal of Engineering and Technology (IRJET), vol. 3 (8), Aug. 2016, pp. 555-558.

Pellicer J.P., "Neural Networks for Document Image and Text Processing," Neural Networks for Document Image and Text Processing, Sep. 2017, 327 pages.

Van Renesse R., et al., "Chain Replication for Supporting High Throughput and Availability," Usenix Association, OSDI'04, 6th Symposium on Operating Systems Design and Implementation, 2004, pp. 91-104.

* cited by examiner

| Timestamp | Content ID | Namespace | Path | User ID | Event | Event ID |
|---|---|---|---|---|---|---|
| t1 | 1 | A | /folder/filename1.doc | A1 | delete | 11 |
| t2 | 45 | CC | /folder/filename2.doc | B1 | add | 22 |
| t3 | 9 | G | /folder/filename3.doc | C1 | edit | 33 |
| t4 | 1,567 | I | /folder/filename4.doc | D1 | view | 44 |
| t5 | 487 | RR | /folder/filename5.doc | E1 | share | 55 |
| t6 | 46 | HR | /folder/filename6.doc | F1 | comment | 66 |
| t7 | 456 | B | /folder/filename7.doc | G1 | delete | 77 |
| t8 | 747 | ER | /folder/filename8.doc | H1 | delete | 88 |
| t8 | 747 | ER | /folder2/filename8.doc | H1 | add | 99 |
| t9 | 456 | ER | /folder/filename9.doc | H1 | delete | 12 |
| t9 | 5 | ER | /folder/filename10.doc | H1 | delete | 23 |
| t9 | 56 | ER | /folder/filename11.doc | H1 | delete | 34 |

FIG. 4C

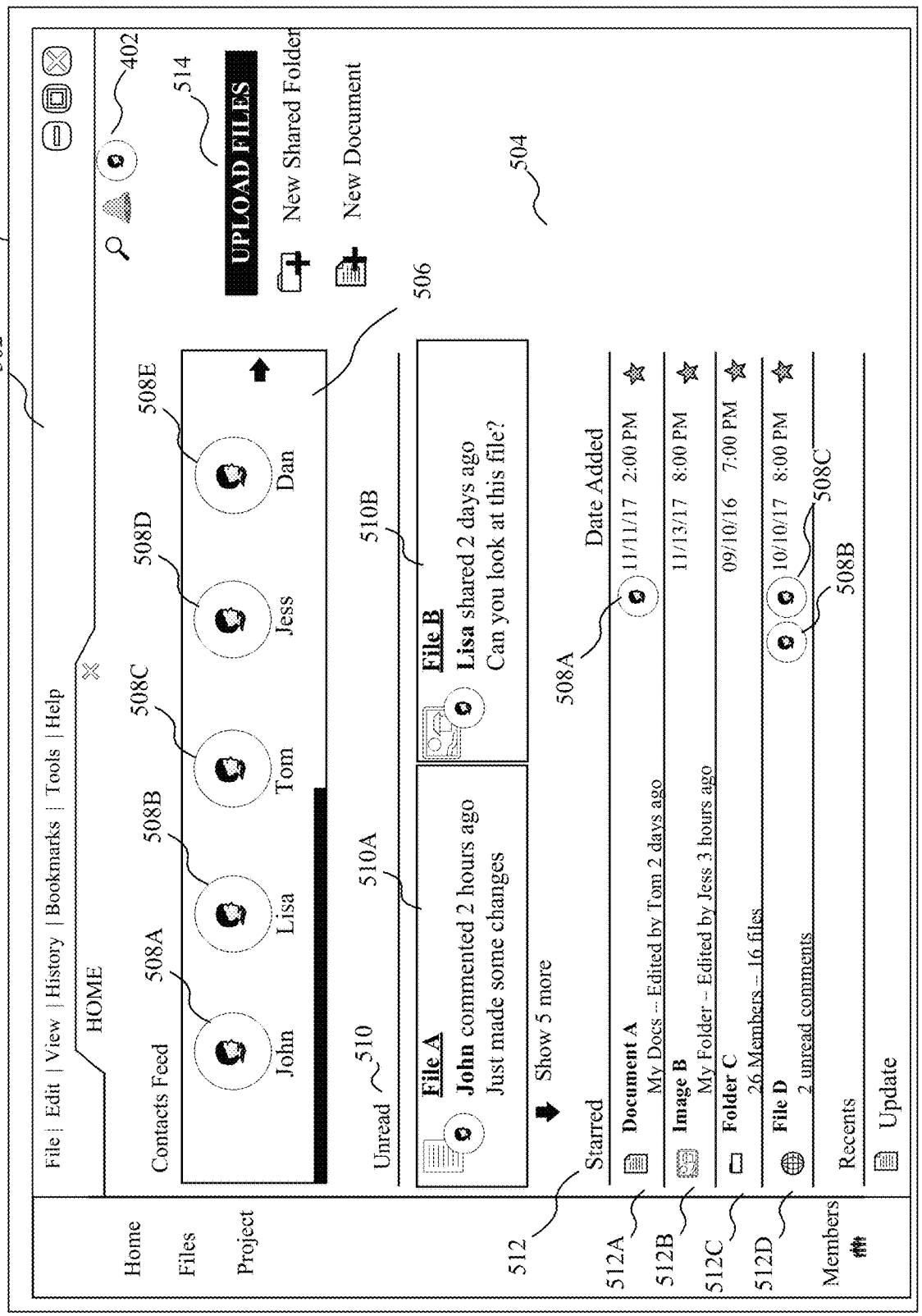

CONTACT EVENT FEEDS AND ACTIVITY UPDATES

TECHNICAL FIELD

The present technology pertains to tracking contact events and activities involving content items associated with a user account in a synchronized collaboration environment.

BACKGROUND

The evolution and ubiquity of software and computer devices has created a digital revolution that continues to reshape business and society. Digital technologies have transformed how users work, interact, and conduct business. For example, users often communicate through electronic mail or messaging systems, create and modify files and documents using specific software applications, manage schedules and events through calendar applications, and store and access data from their computing systems. Network and cloud-based collaboration environments have emerged to facilitate user collaboration between users from anywhere in the world. The widespread adoption of emerging digital and collaboration technologies has had a profound impact on cost, efficiency, and collaboration.

However, the increasing diversity of digital technologies and volume of data used by users has also created significant challenges. For example, the large volume of data and interactions between users can quickly overwhelm users and limit efficiency. Moreover, information can become disorganized and fragmented across devices and storage locations. Users often have difficulty tracking relevant portions of information, and may overlook important items. Users also have great difficulty tracking collaboration events and identifying updates performed by other users on a shared collection of content. In some cases, as the volume data and user interactions increase in a collaboration environment, the cost, efficiency, and collaboration benefits of the collaboration environment can steadily decline.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which:

FIG. 4C illustrates an example event index in accordance with some embodiments of the invention;

FIG. 5A illustrates an example view of a graphical user interface presenting user contact event updates including a contacts feed;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Managing and tracking collaborative interactions with shared content can be a daunting task. Users may collaborate with many other users on a collaborative environment to work as a team on files and projects of common interest. However, users have little visibility into what modifications have been made to a shared collection by other users, and are generally unable to track collaboration events and user activity from other users.

The disclosed technology addresses the need in the art for efficiently tracking, filtering, and presenting activity information and updates to users in a collaboration environment. The approaches set forth herein can efficiently track activity and events from a user's contacts in a collaboration environment, and provide the user with filtered and sanitized updates of activities and events from the user's contacts. The updates of activities and events can be limited to activities pertaining to content items available to, or accessible by, the user, to ensure the updates are relevant and of interest to the user. The updates can also include contact information and context details to enhance the user's collaborative experience.

Disclosed are systems, methods, and computer-readable storage media for tracking contact activity in a collaborative content management system. In one example, a system can identify a plurality of contacts associated with a user account on a collaborative content management system, the plurality of contacts being associated with user accounts on the collaborative content management system. The system can obtain activity data associated with the plurality of contacts, the activity data identifying content interaction events at the collaborative content management system. Based on the activity data, the system can identify a portion of the content interaction events associated with one or more content items accessible to the user account and provide, to a user interface on a client device associated with the user account, a contact activity feed identifying the portion of the content interaction events and respective contacts associated with the portion of the content interaction events.

Figure 1A:
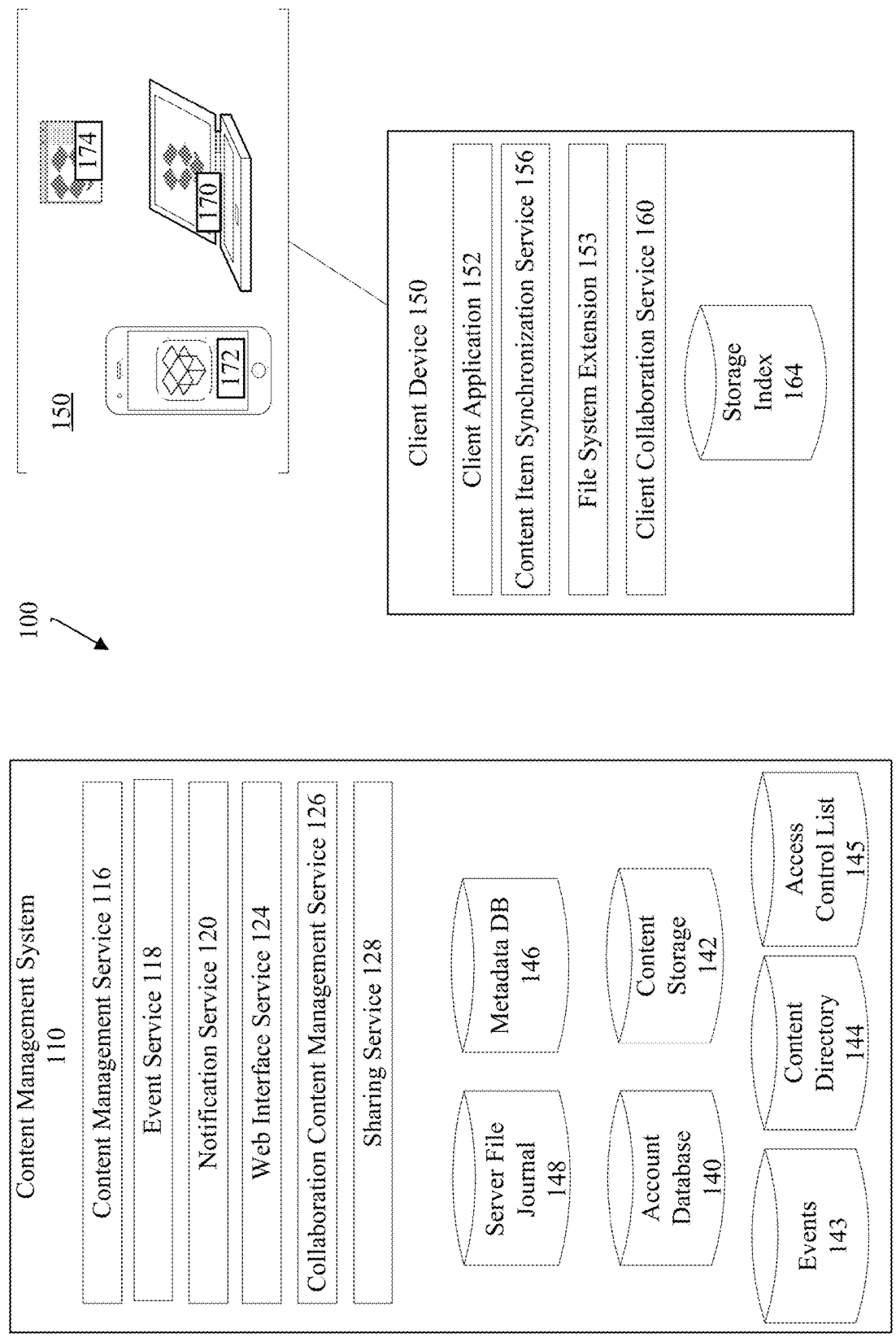
FIG. 1A illustrates an example system configuration of a content management system and client devices.
Figure 1B:
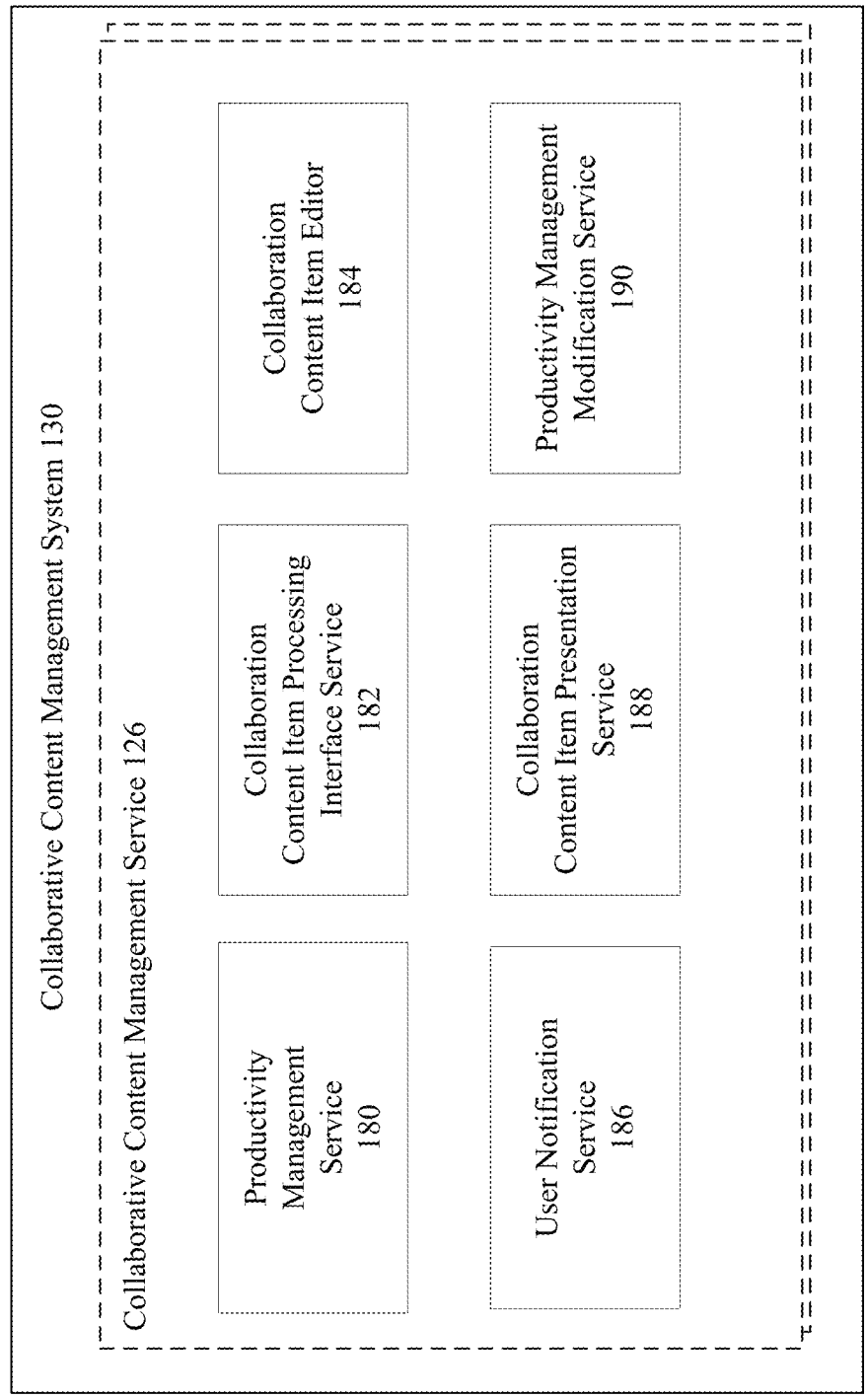
FIG. 1B illustrates an example collaborative content management system for a collaborative content management service in accordance with some embodiments.

Further description, examples, and variations are provided below in the disclosure as follows. The disclosure begins with a discussion of example architectures and configurations for content and collaboration environments, as shown in FIGS. 1A and 1B. A more detailed description of technologies for tracking, filtering, and presenting customized contact event activity and updates to users, as shown in FIGS. 2 through 6, will then follow. The disclosure concludes with a description of an example computing device for accessing content items and collaborating with users, as shown in FIG. 7. The disclosure now turns to FIG. 1A.

In some embodiments the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user whom which a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 117 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

FIG. 1B illustrates an example collaboration content management system 130, according to some embodiments. Collaboration content management system 130 can include one or more servers and/or applications for hosting and running collaboration content management service 126. Collaboration content management system 130 can be part of content management system 110 or separate from content management system 110. For clarity and explanation purposes, collaboration content management system 130 will be described herein as part of content management system 110.

Collaboration content management service 126 can include one or more components and/or services. For example, collaboration content management service 126 may include productivity management service 180, collaboration content item processing interface service 182, collaboration content item editor 184, user notification service 186, collaboration content item presentation service 188, and productivity management modification service 190. Productivity management service 180, collaboration content item processing interface service 182, collaboration content item editor 184, user notification service 186, collaboration content item presentation service 188, and/or productivity management modification service 190 can include one or more services, components, devices, etc., such as physical servers, virtual machines, software containers, etc. Moreover, one or more of productivity management service 180, collaboration content item processing interface service 182, collaboration content item editor 184, user notification service 186, collaboration content item presentation service 188, and productivity management modification service 190 may be coupled to one another or to components not explicitly shown.

Productivity management service 180 may be configured to gather productivity data from content management system 110. In various embodiments, productivity management service 180 identifies an event and gathers information related to the event. For instance, productivity management service 180 may gather a specific calendar entry and/or a specific task from an online calendar. Productivity management service 180 may further gather information from the calendar entry or gather information related to the calendar entry such as time(s), date(s), relevant locations, title(s), agenda(s), summaries, description(s), and/or attendees related to the event. Productivity management service 180 may provide the productivity data to the other modules of collaboration content management service 126.

Collaboration content item processing interface service 182 may be configured to interface with collaboration content management service 126. In various embodiments, collaboration content item processing interface service 182 may provide collaboration content items to one or more modules of collaboration content management service 126, as described further herein.

Collaboration content item editor 184 may be configured to create and/or modify collaboration content items. A collaboration content item may be created in a variety of ways. In some embodiments, collaboration content item editor 184 enables creation of the collaboration content item into the content management system 106. Collaboration content item editor 184 may enable access to or be any collaboration content item editing application (e.g., Microsoft Word®, Google Docs®, or the like) either in the cloud or executed locally. In one example, content management system 106 may provide to one of client devices 150 a user interface element (e.g., a box or a button) that allows creation of a new collaboration content item.

In some embodiments, collaboration content item editor 184 may create the collaboration content item in conjunction with the productivity management service 180. For example, collaboration content item editor 184 may provide a suggestion to a user to create or invoke a collaboration content item associated with an upcoming event. In various embodiments, collaboration content management service 126 may identify a user that is opening or otherwise using collaboration content item editor 184. Productivity management service 180 may identify an upcoming event for the user on the user's calendar. Subsequently, collaboration content item editor 184 may provide a suggestion to the user to create or invoke the collaboration content item associated with the upcoming event.

Although it is discussed that collaboration content item editor 184 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor 184 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor 184 may configure the productivity management service 180 to provide access to the collaboration content item (e.g., using a link, including the collaboration content item, or any other mechanism to enable access to the collaboration content item) in a meeting request, a task entry, or the like. In some embodiments, collaboration content item editor 184 may instruct productivity management service 180 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 150) access to a collaboration content item stored in content management system 106 (e.g., in storage accessible through the cloud) or in productivity management service 180.

Once the user requests to create or invoke the collaboration content item, collaboration content item editor 184 may create and/or invoke a collaboration content item. The collaboration content item may be subsequently edited, altered, viewed, changed, stored, and/or the like by an editing application (e.g., either stored locally on a client device or in the cloud). In various embodiments, one or more different client devices 150 may utilize different editing applications to make changes to the collaboration content item. Collaboration content item editor 184 and/or other editing applications may allow for the collaboration content item to be changed by multiple different users using different client devices 150 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor 184 may receive from users additional content for the collaboration content item. For example, collaboration content item editor 184 may be configured to receive from client devices 150 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor 184 may obtain edits (e.g., text changes and/or additions of audio files, pictures, tables, or the like) from any number of client devices 150 at a given time (or in real time). Collaboration edits may be incorporated in a variety of formats, including formats that provide different text attributes such as colors, fonts, styles, or the like for different users.

In various embodiments, collaboration content item editor 184 (and or a security or permissions module associated with a server) may establish permissions and/or security for the collaboration content item. For example, collaboration content item editor 184 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways.

For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ] @kingHenry" can be interpreted such that @kingHenry links to a user with the username "kingHenry," and this link is used by the primitive "[ ]" to creates a new task, where that task is assigned to the kingHenry user.

In various embodiments, collaborative content item editor 184 (and or a security or permissions module associated with a server) may establish permissions and/or security for the collaborative content item. For example, collaborative content item editor 184 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 186 may be configured to notify users of each of client devices 150 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 186 provides notifications about changes to client devices 150. For example, user notification service 186 may notify users whether a collaboration content item has been created for an event. As another example, user notification service 186 may notify specific users that they have been invited to attend an event.

Collaboration content item presentation service 188 may provide to client devices 150 selected collaboration content items. The collaboration content items may be displayed in client devices 150 through a native application, an Internet browsing window, or the like supported by client devices 150.

It will be appreciated that collaboration content item presentation service 188 may restrict writing permissions to the collaboration content items at any time. In an example, prior to occurrence of the event, collaboration content item presentation service 188 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 188 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 190 may be configured to coordinate collaboration content items with calendar entries and to enable access to the collaboration content item through calendar entries.

Figure 2:
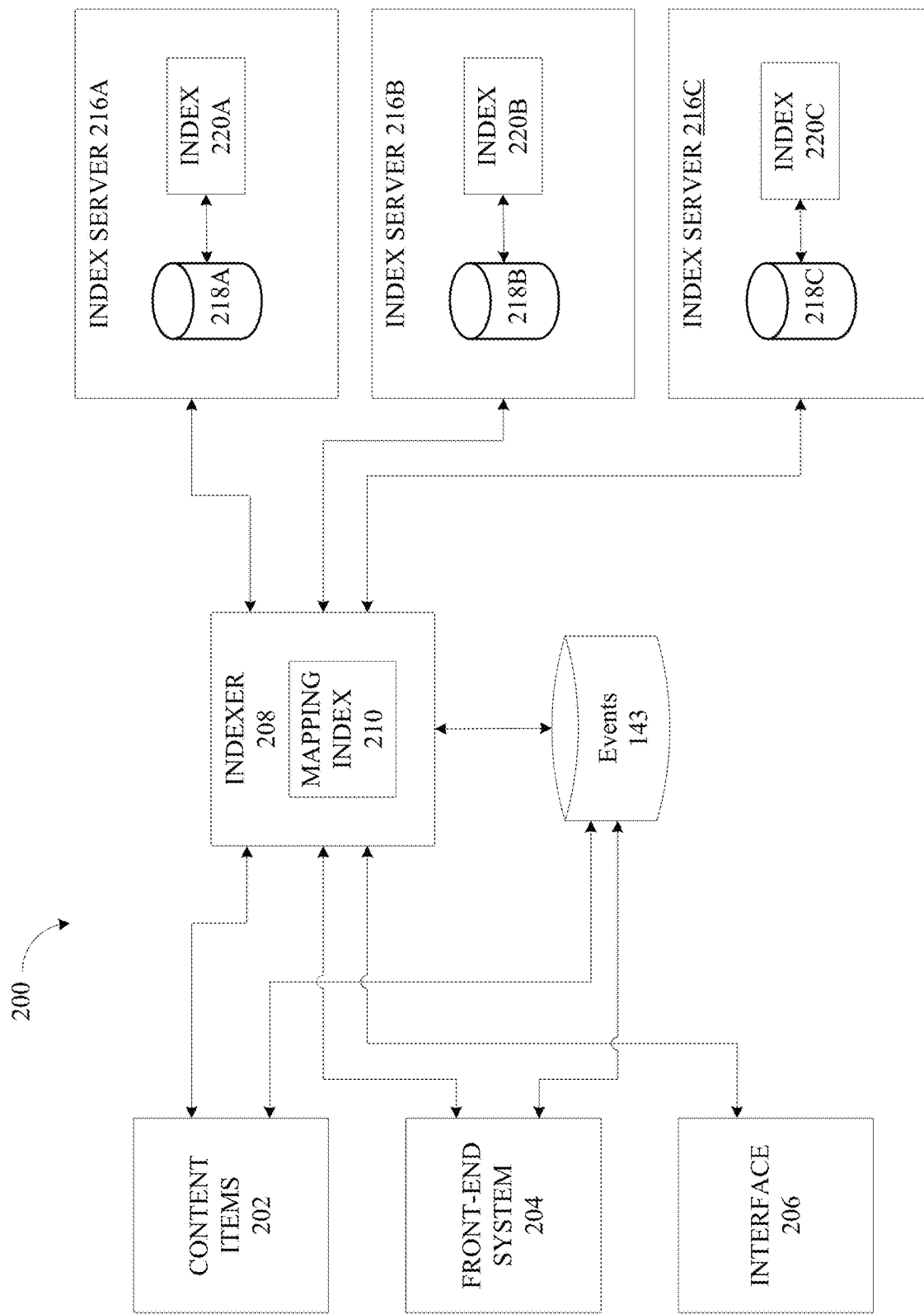
FIG. 2 illustrates a block diagram of an example configuration of a content management system for creating and managing event indexes.

FIG. 2 illustrates a block diagram of an example configuration 200 of content management system 110 for creating and managing event indexes. Configuration 200 can include various components which can be implemented as part of one or more elements in content management system 110, such as, without limitation, content management service 116, event service 118, collaboration content management service 126, account database 140, content storage 142, events 143, content directory 144, etc. For example, configuration 200 can depict an implementation of event service 118 in content management system 110, which can interact with one or more elements in content management system 110, such as events 143 and collaboration content management service 126. However, it should be noted that in some cases one or more components in configuration 200 can be implemented separate from content management system 110. For clarity and explanation purposes, in this example, configuration 200 will be described with reference to content management system 110.

Configuration 200 can be implemented to create events regarding actions on content items 202 (e.g., content items stored in content storage 142) by one or more users. For example, when User A adds a new document to content items 202, event service 118 can create an event (i.e., add) performed on a content item (i.e., the new document) by a user (i.e., User A) as described in configuration 200. Events are generated based on interactions with content items 202, such as additions or modifications to content items 202. For example, an event can be generated when a user adds, shares, posts, creates, edits, deletes, moves, renames, etc., a content item. Events can also be generated based on user account activity, such as viewing a content item, accessing a content item, posting a message, commenting on a content item or page, etc. When a user interaction or activity occurs (e.g., user interacts with a content item), an event identifier (e.g., unique event identifier) and event type can be created and associated with the user (e.g., user identifier and namespace identifier). After an event is created, the event identifier and any information associated with the event can be sent to events 143 for storage.

Configuration 200 can include front-end system 204, interface 206, indexer 208, and one or more index servers 216 (e.g., 216A, 216B, 216C, etc.). Front-end system 204 can be an application(s) or server(s) (e.g., physical server, a virtual machine, a software container, etc.) hosting content items 202. Interface 206 can include a set of routines, protocols and tools for interacting with content items 202. For example, interface 206 can include an application programming interface (API) for interacting with content items and/or collaborating with users, such as DROPBOX PAPER. The events can be created based on interactions with content management system 110 through interface 206. For example, events can be generated when users post, share, edit, add, delete, comment, and interact with other users in a collaborative environment, such as collaborative content management system 130.

As previously mentioned, when an event is created, the event identifier and any information associated with the event can be sent to events 143 for storage. In some cases, front-end system 204 and interface 206 can also send the event identifier and all information associated with the event to indexer 208. In other cases, the event identifier and information associated with the event can be sent from events 143 to indexer 208. Indexer 208 can include a mapping index 210. Mapping index 210 can determine an index server (e.g., 216A, 216B, 216C, etc.) that stores indexes (e.g., 220A, 220B, 220C, etc.) that index events in a given namespace. For example, mapping index 210 can use an identifier (e.g., user, namespace, event, etc.) to identify an index server storing index events in a given namespace. Accordingly, indexer 208 can determine on which index server 216 should the event identifier and information associated with the event be stored.

The new event identifier and information associated with the event can be written to one or more indexes (e.g., 220A, 220B, 220C, etc.) stored at an index server (e.g., 216A, 216B, 216C, etc.). For example, each index server (e.g., 216A, 216B, 216C, etc.) can periodically (e.g., hourly, daily, etc.) request from indexer 208 events it is assigned to store. Since, indexer 208 is aware of which index server each event is to be stored, indexer 208 can provide the appropriate event data (e.g., event identifier and information associated with the event) when requested by the index server. The appropriate event data can then be stored in an index of the requesting index server.

In some examples, the appropriate index server can be based on a namespace of the user. For example, a user can have access to two types of namespaces, a root namespace and a shared namespace. A root namespace, on a content management service, is assigned to the user on creation of an account with content management system 110. The user has read/write access to the root namespace. A shared namespace, on a content management service, can be assigned (or accessed) to multiple users at various times throughout the life of the shared namespace. In some examples, the appropriate index server can be based on the namespace the event takes place. For example, when an event takes place on a content item stored in the root namespace (or shared namespace), the index server where the root namespace events have been stored previously and select that same index server for storage of the current event data.

In some cases, when an index server is determined, the resulting mapping of the index server and namespace identifier are stored in mapping index 210 for future requests. A deterministic mapping function can receive identifying information of the index server were the event data was stored (e.g., a hostname or a network address) and the namespace identifier. The deterministic mapping function can apply a hash function (e.g., one-way hash function, a simple hash function, a consistent hash function, etc.) to the namespace identifier and store hashed value and the identifying information in mapping index 210. In some examples, a deterministic mapping function may include a hash mechanism and a modulo mechanism.

Index servers 216 can include one or more servers. In some examples, index servers 216 can include a plurality of servers distributed in a horizontal fashion to provide load balancing, failover, or redundancy for event indexes (e.g., 220A, 220B, 220C, etc.). In this example, each of the index servers may store a replica or copy of the event indexes. The event indexes (e.g., 220A, 220B, 220C, etc.) can be stored on one or more partitions 218A, 218B, 218C of index servers 216.

Figure 3:
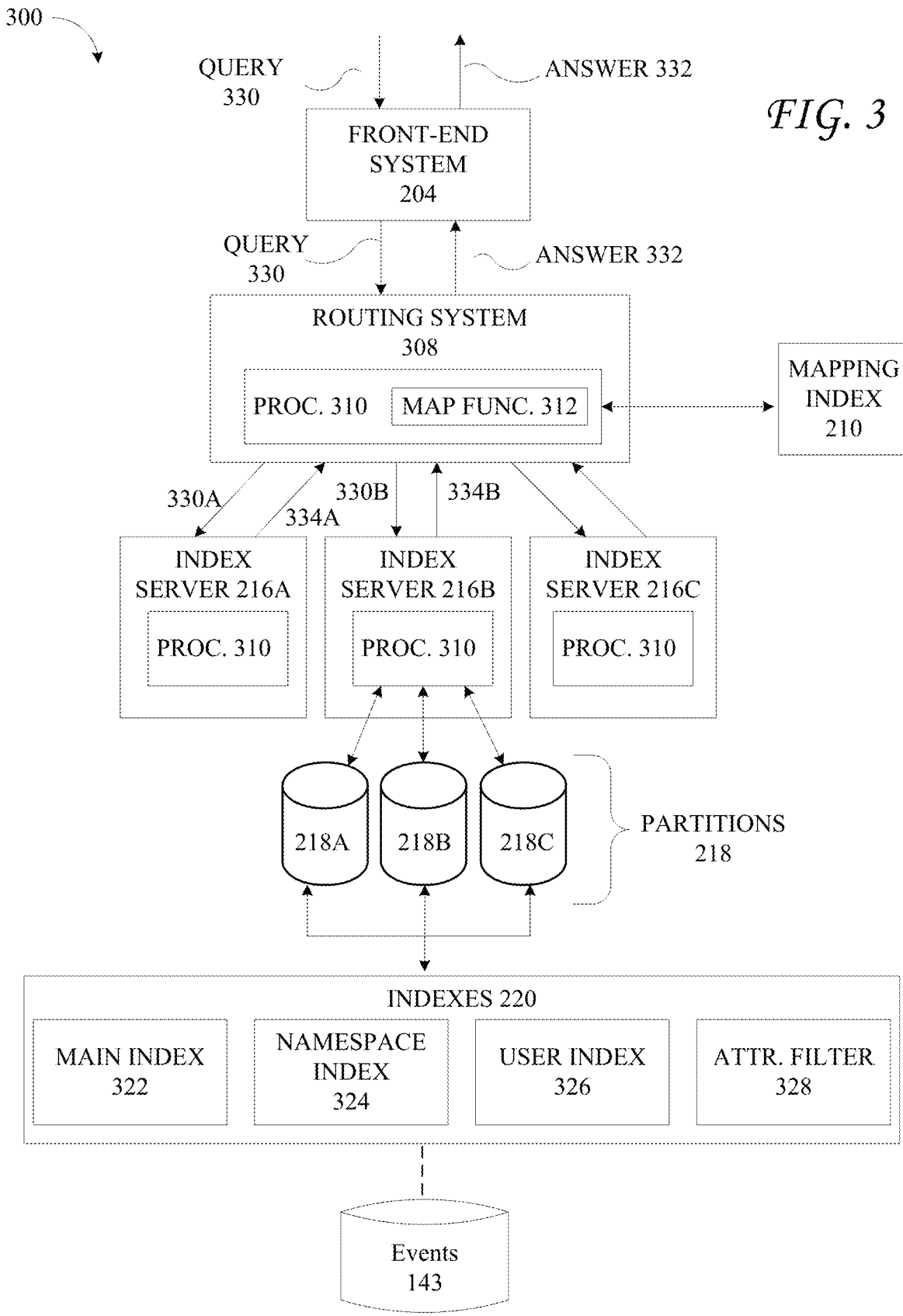
FIG. 3 illustrates a block diagram of an example configuration for serving and querying event data.

FIG. 3 illustrates a block diagram of an example configuration 300 for serving and querying event data. Configuration 300 can be implemented by content management system 110 or a separate system. For example, configuration 300 can be implemented by content management system 110 using event service 118 and events 143. As illustrated in configuration 300, front-end system 204 can communicate with routing system 308 to query and obtain event data.

Routing system 308 can include processor 310. Processor 310 can be distributed over two-levels: (1) index servers 216 which are responsible for storing event indexes 220 and processing queries 330 against the event indexes 220 (e.g., main indexes 322, namespace indexes 324, user identifier indexes 326, and attributes filter 328), and (2) routing system 308 which is responsible for routing queries 330 from front-end system 204 to the appropriate index servers 216 based on namespace identifiers associated with the queries 330 and combining answers 334 returned from index servers 216 into answers 332 that are provided to front-end system 204 and ultimately to client devices 150.

Event indexes 220 can include sharded dynamic and/or static indexes. In some examples, event indexes 220 include recent events (e.g., 24-hours, 48-hours, etc.) and historical events (e.g., older than 24-hours, etc.). Each index (e.g., 322, 324, 326, and 328) of event indexes 220 may be stored at a corresponding index server (e.g., 216A, 216B, 216C, . . . 216N). Each index (e.g., 322, 324, 326, and 328) at an index server (e.g., 216B) may index events in one or more namespaces assigned to the index server (e.g., 216B).

In operation, front-end system 204 receives search query 330 from client device 150 and returns a personalized answer 332 back to client device 150. Answer 332 may be personalized in the sense that the events identified in answer 334 for query 330 may be events that belong to a namespace the user is authorized to access. For example, front-end system 204 may receive a query (e.g., query 330) from an authenticated user (e.g., authenticated user account at content management system 110), and return an answer (e.g., answer 332) to the authenticated user that specifically pertains to events that belong to the authenticated user account, such as events associated with a content item or namespace the authenticated user account is authorized to access. In some cases, answer 332 to query 330 may be restricted to events indexed in event indexes 220 that satisfy query 330 and belong to a namespace that the authenticated user is authorized to access (e.g., root namespace, shared namespace, etc.).

In some cases, query 330 may also specify identifier(s) of namespace(s) that the user wishes to search. In this case, an intersection of the set of identifier(s) of namespace(s) that the user wishes to search and the set of identifier(s) of authorized namespace(s) the user is permitted to access may be computed to determine identifier(s) of authorized namespace(s) to search. For example, front-end system 204 can perform such intersection search and analysis.

If query 330 does not specify a specific namespace(s) to search, a default set of identifier(s) of authorized namespace(s) to search may be selected. The default set can identify, for example, all namespaces the user is permitted to access (e.g., all namespaces associated with the authenticated user's account, or a subset thereof.

After the identifier(s) of authorized namespace(s) to search have been determined, query 330 and the identifier(s) of authorized namespace(s) to search can be sent from front-end system 204 to routing system 308 for further processing of query 330 by processor 310. In some cases, query 330 can also include one or more user identifiers (e.g., a user identifier associated with an authenticated user account, a user identifier associated with a user account of a contact of the authenticated user account, etc.), a type of event (e.g., add, edit, modify, delete, comment, view, share, etc.), a time range, one or more attributes (e.g., action type, path, document identifier, etc.), a maximum number of results, etc.

Processor 310 at routing system 308 can receive query 330 and the identifier(s) of the authorized namespace(s) to search, and determine one or more index servers 216 to which to route query 330. This determination may be based on deterministic mapping function 312 applied by routing system 308 to each of the identifier(s) of the authorized namespace(s) to search. Routing system 308 can use deterministic mapping function 312 and mapping index 210 to identify, based on an identifier of a namespace, an index server (e.g., 216B) storing event indexes (e.g., one or more indexes in event index 220) including events in the given namespace.

In some cases, mapping function 312 can apply a hash function (e.g, a one-way hash function, a simple hash function, a consistent hash function, etc.) to a namespace identifier to search and identify event indexes (e.g., event index 220) assigned to the namespace. For example, processor 310 at routing system 308 can access mapping index 210 to make this determination. Together, deterministic mapping function 312 and mapping index 210 can allow processor 310 at routing system 308 to determine a hostname or a network address of an index server (e.g., 216B) at which one or more event indexes (e.g., event index 220) containing one or more indexes for a given namespace are stored.

In some cases, deterministic mapping function 312 may include a hash mechanism and a modulo mechanism. Hash mechanism may accept a namespace identifier as input (e.g., character string data representing the namespace identifier) and may produce a hash value hv as output. For example, the hash mechanism may be based on the MD4, MD5, SHA-1, or SHA2 message-digest algorithm which, when applied to a namespace identifier provided as input, produces a hash value as output. The modulo mechanism may compute the remainder r of division of the hash value hv by a modulus k, thereby mapping the input namespace identifier to one of k values in the range of 0 to k−1. The value of the modulus k may be selected based on one or more factors including, for example, the number of actual, expected, or desired index servers 216; the number of actual, expected, or desired namespaces indexed by event indexes 220; the number of actual, expected, or desired namespaces groups; etc.

Mapping index 210 can include a respective entry for index servers 216. In some cases, each entry can be keyed by one or more non-overlapping sub-ranges in the range 0 to k−1. For example, a first entry E1 in mapping index 210 may have a key including the values K1 and K2 defining a first range of consecutive values in the range 0 to k−1 and a second entry E2 in mapping index 210 may have a key including the values K3 and K4 defining a second range of consecutive values in the range 0 to k−1 where the first range K1 to K2 does not overlap the second range K3 to K4.

When processor 310 at routing system 308 applies deterministic mapping function 312 to a given namespace identifier, a value r in the range 0 to k−1 may be produced. Processor 310 at routing system 308 may consult mapping index 210 with the value r to identify the entry for which r is within the range of the entry key. A hostname or network address of this entry may identify an index server (e.g., 216) storing one or more event indexes (e.g., 220) that index events belonging to the given namespace.

In some examples, the namespaces assigned to an event index are grouped into a fewer number of namespace groups of the event indexes so as to reduce the number of index files stored at the index server (e.g., 216) storing the event index. In other words, within a sharded event index, the namespaces assigned to the event indexes may be partitioned into namespace groups (e.g., partitions 218). Each such namespace group may include multiple namespaces.

Although, in FIG. 3, mapping index 210 is shown separately from deterministic mapping function 312 and processor 310 at routing system 308, mapping index 210 may be a component of deterministic mapping function 312 or processor 310 at routing system 308. Further, routing system 308 (and any servers included in routing system 308) can have access to mapping index 210. For example, a copy of mapping index 210 may be stored (e.g., cached) at each server in routing system 308 for efficient access. In some cases, mapping index 210 can be made available to routing system 308, or any server thereof, as a network service.

In some examples, routing system 308 can include multiple routing servers scaled in a horizontal fashion for load balancing, increased capacity, increased throughput, reduced latency, failover, redundancy, etc. Moreover, an index server (e.g., 216B) can include a plurality of servers distributed in a horizontal fashion to provide load balancing, failover, or redundancy for event indexes 220. In this case, each of the index servers may store a replica or copy of event indexes 220.

In some examples, index server 216 can include multiple servers, with each of the servers storing a portion of event indexes 220. In this case, there may be multiple levels of routing servers. A first routing level is exemplified by routing system 308 that routes query 330 received from front-end system 204 to one or more index servers 216. A second level of routing servers may exist to further route queries within index server 216 to one or more servers of index server 216. The second level routing servers may also have a deterministic mapping function and mapping, like deterministic mapping function 312 and mapping index 210, for further routing the queries based on identifiers of namespaces.

In the example illustrated in FIG. 3, query 330 is routed by routing system 308 according to deterministic mapping function 312 and mapping index 210 to index servers 216A and 216B. However, in other cases, query 330 can be routed to a single index server, a different set of index servers, or more than two index servers. The number of index servers can depend on, for example, the number of authorized namespaces to search with query 330. To illustrate, if there is only one authorized namespace to search or if all of the authorized namespaces to search are assigned to a same event index, then query 330 may have be routed by routing system 308 a single, specific index server, such as index server 216B.

When routing query 330 to index server 216B, routing system 308 can send a network request to index server 216B including query 330. The network request may include, for example, identifier(s) of authorized namespace(s) to search assigned to one or more event indexes 220 stored at index server 216B. In addition, each authorized namespace identifier may be associated in the network request with an identifier of the namespace group to which the namespace belongs.

In some cases, sharded event index 220 can index events in multiple different indexes. In this example, sharded event index 220 indexes events in main index 322, namespace index 324, user identifier index 326, and attribute filter 328. The indexes 322, 324, 326, 328 can be key/value pair indexes (e.g., LevelDB, etc.). Indexes 322, 324, 326, 328 can store events based on one or more parameters, such as time. For example, indexes 322, 324, 326, 328 can store events in reverse time order (i.e., newest events at top of index).

Main index 322 includes events (and associated data) of the namespaces for which index server 216B serves. Namespace index 324 and user identifier index 326 include subsets of events (and subsets of the associated data of events) stored in the main index 322 based on namespace identifiers and user identifiers, respectively. When routing system 308 determines (e.g., based on mapping function 312) that index server 216B includes events for a namespace of query 330, a partial query 330B is routed to index server 216B. When index server 216B receives partial query 330B, processor 310 can determine a partition 218 where events of the namespace to be queried are located. Namespace index 324 and user identifier index 326 can be traversed in parallel (i.e., keys of the indexes can be traversed to determine matches with the namespace identifier or user identifier). Namespace index 324 is traversed with a namespace identifier provided by query 330B and user identifier index 326 is traversed with a user identifier provided by query 330B. Accordingly, processor 310 at the index server 216B can restrict the events identified in answer 332B to only events that belong to an authorized namespace or user identifier to be searched.

The results from the query on namespace index 324 can be intersected with results from the query on user identifier index 326 by event identifier (i.e., determine which events have the specified namespace identifier and user identifier). In other examples, more than two indexes can be intersected. For example, N indexes can be intersected.

The intersected results from the traversal of namespace indexes 324 and user identifier indexes 326 include events that intersect with an authorized namespace (i.e., root namespace or shared namespace) and user identifier (i.e., associated with user account). However, the intersected results may include only a subset of the associated data. In order to complete the query, the intersected results can be combined with main indexes 322. Main indexes 322, as previously described, include all events and all associated data (e.g., namespace identifier, user identifier, event type, time stamp, etc.). The combination of main indexes 322 and the intersected results from the query of namespace index 324 and user identifier 326 can create a payload (i.e., a query of the events associated with the user identifier and namespace, along with all associated data).

In some instances, the payload can be filtered with attribute filter 328. For example, when one or more attributes are included with query 330, the one or more attributes can be used to filter the payload. The filtering can be performed before or after the payload is determined. In some cases, the attributes can be used to filter the payload. For example, an attribute of "path" can be provided with the query. In response to the attribute "path," the payload filters out all results where the "path" provided in the query does not equal the "path" in the payload. As another example, attributes identifying a user's contacts can be provided with the query and used to filter the payload by the user's contacts.

In response to a completed query, index server 216B can send answer 334B to routing system 308, which can identify one or more events in one or more of the authorized namespaces that satisfy the query 330. In response to receiving answer 334B (and any other partial answers from other index serves 216), routing system 308 can send answer 332 to front-end system 204, to be returned to the user.

As an example, assume the network request including query 330 sent from front-end system 204 to routing system 308 specifies that two authorized namespaces are to be searched with corresponding namespace identifiers "abcd" and "defg", and one user is to be searched with corresponding user identifier "User A". Further assume that according to deterministic mapping function 312 and mapping index 210, authorized namespace "abcd" belongs to namespace group "1234" and is assigned to sharded event index 220A of index server 216A and authorized namespace "defg" belongs to namespace group "5678" and is assigned to sharded event index 220B of index server 216B.

In this example, the network request from routing system 308 to index server 216A may specify that namespace "abcd" in namespace group "1234" is to be searched and the network request from routing system 308 to index server 216B may specify that namespace "defg" in namespace group "5678" is to be searched. Index server 216A may use the namespace group identifier "1234" in the network request sent to index server 216A to traverse namespace index 324 and return results matching identifier "1234" along with associated event identifiers. User identifier index 326 can be traversed (e.g., in parallel) with user identifier "User A" to return results matching the user identifier and associated event identifiers. Index server 216B may use the namespace group identifier "5678" and user identifier "User A" in the network request sent to index server 216B to search the corresponding indexes. The traversal results of namespace index 324 and user identifier index 326 can be intersected by the associated event identifiers (i.e., to determine which events have the specified namespace and user identifiers, remove duplicates, etc.). The intersected results can be combined with main index 322 to create a payload.

The payload includes the data associated with the event (e.g., event type, time stamp, user identifier, namespace identifier, etc.).

Figure 4A:
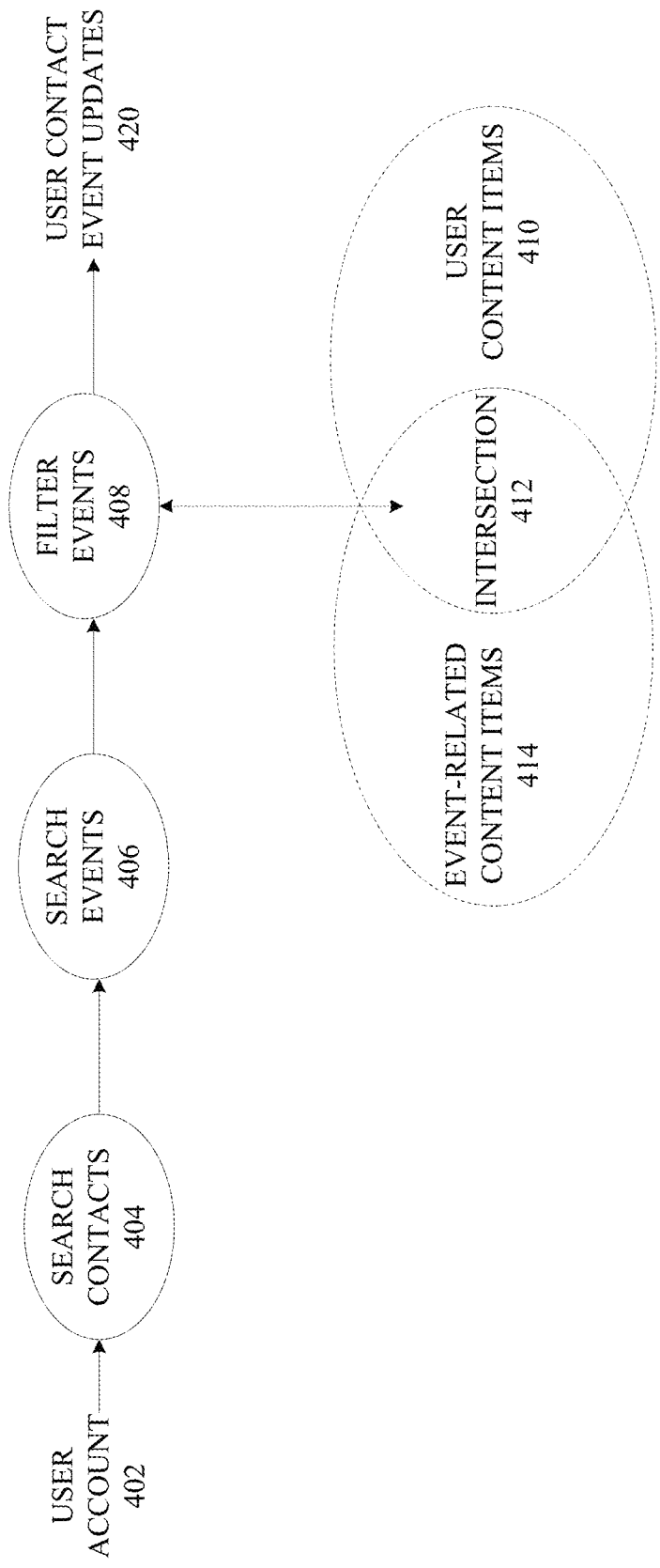
FIG. 4A illustrates an example process for providing user contact event updates.

FIG. 4A illustrates an example process 400 for identifying updates for a user pertaining to events from the user's contacts. For example, process 400 can identify contacts associated with a user's account on content management system, and identify events from such contacts involving content items the user is authorized to access. The identified events can then be provided to the user as updates which identify activity by the user's contacts that pertain to the user.

In this example, user account 402 can be an account registered by a user at content management system 110, and used by the user to access content management system 110. User account 402 can have a unique account identifier that uniquely identifies at content management system 110. User account 402 can be used by a user to authenticate and establish a session at content management system 110, which the user can use to access content and interact with other users at content management system 110. For example, User A can authenticate and establish a session at content management system 110 via user account 402. During the authenticated session, the user can access content and collaborate with other users via collaborative content management system 130 and/or content management system 110, for example.

At step 404, process 400 can search for contacts associated with user account 402 in content management system 110. The contacts can represent specific users, user accounts, and/or user profiles associated with user account 402. For example, the contacts can be user accounts registered as a contact on, or for, user account 402. In some cases, the contacts can be users (e.g., user accounts, user profiles, user identifiers, usernames, etc.) having a common membership to a group of user account 402, users having access to a common content item as user account 402 (e.g., shared namespace), users that have previously communicated or collaborated with user account 402 through content management system 110, users added to a contacts portion of user account 402, or users otherwise related or linked within content management system 110 to user account 402. For example, the contacts can include users defined at user account 402 as contacts.

The contacts can be associated with user account 402 or created for user account 402 in various ways. For example, a contact can be added to user account 402 by the user (e.g., manually), added by the contact (e.g., via a request to connect, a request to join a group, etc.), or added by content management system 110 (e.g., based on activity between user account 402 and the contact, based on a subscription such as a family or business subscription, based on a group membership, based on a common ownership of an account or content item, based on a service or account registration, based on one or more common factors, etc.). Having contacts can allow the user of user account 402 to communicate with those contacts, collaborate with those contacts, share items with those contacts, access common services or content items, create group projects, etc.

The contacts of user account 402 can include information which can be used to identify the contacts, such as a name, telephone number, email address, user identifier, username, user account, user profile, alias, etc. Such information can be used to uniquely identify the contacts within content management system 110, as well as information pertaining to the contacts, such as a user account, a user profile, a namespace, a group membership, access permissions, user activity, user settings, events, etc. For example, such information can be used to identify respective user accounts or user identifiers on content management system 110 corresponding to the contacts of user account 402.

The results of the search for contacts at step 404 can identify the contacts associated with user account 402. For example, the results can include respective user accounts or user identifiers on content management system 110 corresponding to the contacts, and/or information for identifying the respective user accounts or user identifiers on content management system 110. In some cases, the results can identify all contacts associated with user account 402. In other cases, the results can include a subset of contacts, such as the top N contacts associated with user account 402. The top N contacts can include a subset of contacts determined or predicted to have a higher priority, rank, or relevance for user account 402 based on one or more factors, such as a number of communications with user account 402, a number of interactions with user account 402, an amount of shared content items with user account 402, an amount of common characteristics, user preferences, a recency of communications or interactions, a relationship (e.g., family, employee and employer, client and business, etc.), group membership, a general popularity or rank, a pattern of activity, etc.

Once the user accounts or user account identifiers corresponding to the contacts of user account 402 have been identified, at step 406 the user accounts or user identifiers can be used to search events that correspond to the contacts of user account 402. For example, a query, such as query 330 in FIG. 3, can be generated to search indexes 220, and identify events (e.g., event identifiers) corresponding to the user accounts or user identifiers associated with the contacts of user account 402. To illustrate, a query can be generated and processed as described in FIG. 3 to query namespace index 324 and/or user identifier index 326 for events (e.g., event identifiers and associated data) associated with the contacts (e.g., user identifiers of the contacts) of user account 402.

The results at step 406 can include the events (e.g., event identifiers and associated data) identified for the contacts associated with user account 402. The events can include all events of the contacts or a subset of all events of the contacts. For example, the results can include a subset of all events filtered based on a specific criteria, such as a time period.

At step 408, the events from step 406 are filtered to identify those events that are relevant to user account 402. For example, the events can be filtered by corresponding content to identify those of the events pertaining to content items that user account 402 is authorized to access (e.g., common content items, shared namespaces, etc.). For example, user content items 410 associated with user account 402 can be compared with event-related content items 414 to identify intersection 412 representing those of event-related content items 414 that user account 402 is authorized to access. In this example, event-related content items 414 are the content items associated with the events identified at step 406 pertaining to the contacts of user account 402. User content items 410 are the content items that user account 402 has access to (e.g., is authorized to access) on content management system 110. Thus, intersection 412 is the intersection of both access sets: the content items associated with the events identified for the contacts (i.e., event-related content items 414), and the content items that user account 402 has access to or is authorized to access (i.e., user content items 410).

The filtered events from step 408 can thus include the events associated with intersection 412. As a result, the filtered events from step 408 correspond to events from contacts of user account 402 that pertain to content items that user account 402 has access to or is authorized to access. The results from step 408 can include event identifiers associated with the filtered events, content item information associated with the filtered events (e.g., content item identifiers, namespaces, content paths, etc.), and data associated with the filtered events (e.g., event description, event timestamps, user identifiers, etc.).

The results from step 408 can be used to automatically generate user contact event updates 420 to user account 402. User contact event updates 420 can include information about the filtered events, such as event descriptions, event timestamps, associated users or contacts, associated content items, associated activity, etc. For example, user contact event updates 420 can include alerts or notifications provided on a graphical user interface of client device 150 during a session of user account 402, and identifying the events that occurred, the users associated with the events, the time of the events, the content items associated with the events, a description of the activity performed by the users in the event, etc. User contact event updates 420 can also include suggestions, prompts, or options to allow the user of user account 402 to interact with the users associated with the events, interact with the content items associated with the events, review the activity or events, respond to the events, accept or reject changes or modifications made to content by the events, etc.

Moreover, user contact event updates 420 can include other information or activity that may be unrelated to the events but pertaining to the users associated with the events. For example, user contact event updates 420 can include an indication of other information about the users and/or activities being performed by the users associated with the events that are separate from, or unrelated to, the activities represented by the events. To illustrate, user contact event updates 420 can include a notification of a comment added by contact A to document B shared with user account 402, and also include an indication of other, unrelated activities and information of contact A, such as an entry in contact A's calendar or an activity performed at contact A's client device, such as a soundtrack being played by contact A via a music application at the client device.

In some cases, process 400 can be triggered automatically or dynamically (e.g., in real time or near real time) in response to one or more triggering events or conditions. Thus, user contact event updates 420 can be generated by process 400 automatically or dynamically in response to one or more triggering events or conditions. For example, process 400 and/or user contact event updates 420 can be triggered by user events (e.g., user contact activity) detected by content management system 110. When content management system 110 detects the user events (e.g., add events, edit events, delete events, comment events, move events, rename events, share events, etc.), content management system 110 can perform process 400 and/or generate user contact event updates 420 based on the user events detected. Content management system 110 can continue to perform process 400 and/or generate user contact event updates 420 as new user contact activity is detected. Accordingly, user contact event updates 420 can change to reflect the latest activity of one or more user contacts associated with user account 402 and/or the state of content items associated with user account 402.

While user contact event updates 420 can describe or identify specific user activity and content item events, including comments or messages generated by user contacts, user contact event updates 420 nevertheless differ from updates manually posted by a user for presentation to other users, such as status or activity updates posted by a user on a site or page (e.g., a web page) presented or available to user account 402. For example, user contact event updates 420 can identify or describe one or more comments or messages posted by a user contact on a page or content item associated with user account 402. However, user contact event updates 420 are not themselves the actual comments or messages posted by the user contact, but rather updates generated separately from the actual comments or messages posted by the user contact, to describe or identify the actual comments or messages posted by the user contact.

In other words, user contact event updates 420 are not user-generated updates posted by a user, but rather system-generated updates associated with user activity or events. Moreover, user contact event updates 420 can be generated for specific user activity irrespective of the user or semantic intent associated with the user activity. For example, user contact event updates 420 can be generated for user activity regardless of whether the user activity constitutes a user-generated update or is intended by a user as an update for other users.

To illustrate, assume user contact event updates 420 include a first update and a second update. The first update indicates a user contact has modified a content item associated with user account 402. The user contact may have modified the content item without posting an update for user account 402 indicating that the content item was modified. The second update indicates the user contact has posted a comment or message. The user contact may have posted the comment or message specifically for presentation to user account 402. The comment or message may constitute a user-generated update for user account 402. In both examples, the first and second updates are separate from the activities identified by the first and second updates (i.e., the content item modification and the posted comment or message). Moreover, both the first and second updates are generated regardless of whether the identified activities include user-generated updates or are intended for presentation to user account 402.

Figure 4B:
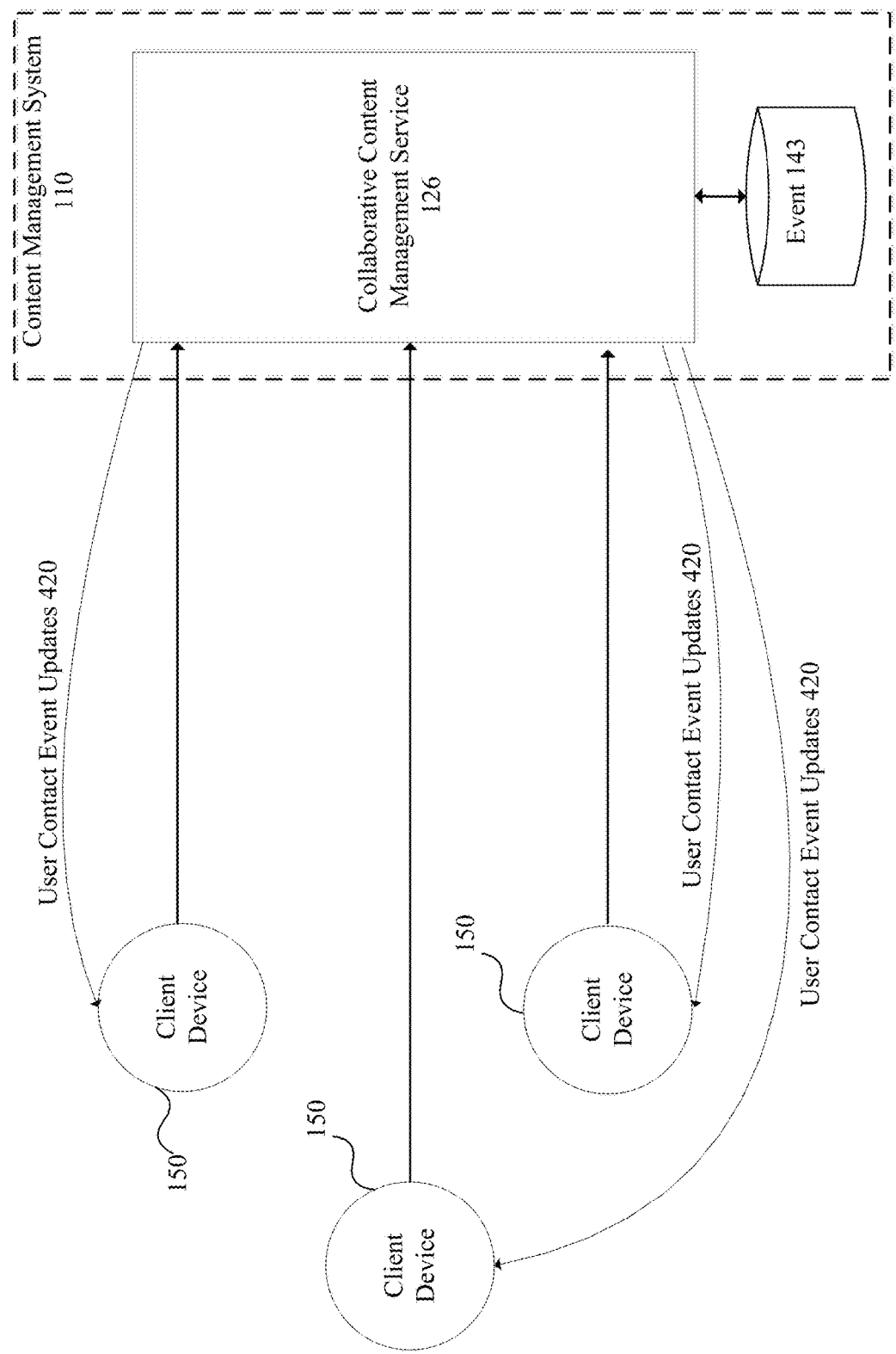
FIG. 4B illustrates an example of user contact event updates provided to a client device.

FIG. 4B illustrates an example of user contact event updates 420 sent to client device 150. In this example, client devices 150 have a session established with content management system 110. Here, client devices 150 are interacting with content management system 110 through collaborative content management service 126. Users at client devices 150 can be authenticated for the session via respective user accounts. For example, a user can be authenticated via user account 402, which allows the user to access content items in content management system 110 and collaborate with other users and content items through collaborative content management service 126.

Content management system 110 and/or collaborative content management service 126 can obtain user contact event updates 420 as described in process 400 shown in FIG. 4A. Content management system 110 and/or collaborative content management service 126 can send user contact event updates 420 to client devices 150, which are customized for the particular user account used at each client device 150 to authenticate with content management system 110. Content management system 110 and/or collaborative content management service 126 can send user contact event updates 420 as events occur, as updates are calculated, as updates are requested by the user or pulled from client devices 150, periodically based on a particular time interval, when the events in user contact event updates 420 reach a threshold number, as the user interacts with user content event updates previously sent, etc.

In some cases, users can configure the amount, frequency, detail, etc., of user contact event updates 420 sent to client devices 150 for their particular user accounts (e.g., user account 402). For example, a user can turn off user contact event updates 420 for user account 402, increase/decrease the frequency of user contact event updates 420 sent to user account 402, define what information is included in user contact event updates 420 for user account 402, define which contacts should be included/excluded or prioritized in user contact event updates 420 for user account 402, define how or where user contact event updates 420 are presented for user account 402, define which content items should be included/excluded or prioritized in user contact event updates 420 for user account 402, etc. Example graphical user interfaces for the user to receive and interact with user contact event updates 420 are further described below in FIGS. 5A and 5B.

FIG. 4C illustrates an example event index 420 containing event data. Event index 420 can be stored in events 143 as previously described. For explanation purposes, event index 420 is presented in FIG. 4C as a table. However, as one of skill in the art will recognize, other data structures are possible.

In this example, the data in event index 420 includes timestamps (column 432), content identifiers (column 434), namespaces (column 436), paths (column 438), user identifiers (column 440), events (column 442), and event identifiers (column 444). The data in event index 420 represents non-limiting examples of event data provided for explanation purposes. One of ordinary skill in the art will recognize that other data can also be captured in event index 400. For example, event index 420 can include additional event and/or content item details, versioning information, user access information associated with content items related to the events, usernames, group membership information, user identifiers of users having access to content items associated with the events, etc.

The events identified in event column 442 and event ID column 444 are associated with a content item (e.g., file, directory, etc.) identified in content identifier column 434 and/or content path column 438. Each event corresponding to a particular content item can be recorded in event index 420. Information about the event or the type of the event can be recorded in event column 442 and information for identifying the event (e.g., event identifiers) can be recorded in event identifier column 444. The event identifiers in event identifier column 444 can be unique identifiers for uniquely identifying particular events. A non-exhaustive list of event types can include add, delete, edit, view, share, comment, post, etc. In the first row of event index 420, corresponding to timestamp "t1" in timestamp column 432, the event in event column 442 is a delete event and has an event identifier "I1" in event identifier column 444.

The content identifiers (IDs) in content ID column 434 can identify each content item in event index 420. For example, the delete event in the first row (timestamp 't1') is associated with a content item with content ID "1" in content ID column 434. Content IDs in content ID column 434 can be any assigned value or a hash that identifies the respective content items. For example, the content IDs can be an assigned value or a hash of the content item name or portion of the content item, such as a block or chunk of the data content of the content item. A content item can be identified by an associated path from path column 438 and/or a content ID of the content item from content ID column 434. However, in some cases, a content item may be identified by either the path or content ID. For example, the content item may be identified by the associated path in path column 438, and an explicit content ID may not be necessary to identify the content item. In other cases, a content item may be identified by the content ID, and the path may not be needed to identify the content item.

An event, such as the delete event in the first row of event index 420, can be associated with a timestamp, which can be stored in timestamp column 432. The timestamp can be the time the event was detected or committed at content management system 110. In some cases, the timestamp can be a time that the event actually occurred or was initially detected/recorded. For example, events can occur on client device 150, and synchronized and committed to content management system 110 (e.g., via content item synchronization service 156) at a later time. Thus, the timestamp can capture the time the event occurred on client device 150, the time the event was reported to content management system 110, the time the event was committed or recorded at content management system 110, etc.

An event can be associated with a namespace, and the namespace can be recorded in namespace column 436. A namespace can be analogous in some ways to a root level of a file system directory. However, content management system 110 can manage multiple namespaces. As such, each namespace can be an abstraction of the root directory of a file system directory tree. Each user has private access to a root namespace. In addition, shared collections have a namespace (e.g., shared namespace) that can be mounted within one or more root namespaces. With this abstraction, a content item on content management system 110 can be uniquely identified by a namespace in namespace column 436 and a relative path in path column 438. The namespaces shown in namespace column 436 can be root namespaces or shared namespaces (e.g., namespaces for shared collections or content items). The paths shown in path column 438 reflect a path under either a particular namespace, which can be a root or shared namespace as previously mentioned. The path can identify any subdirectories and end in a filename. The syntax of the example paths in event index 420 is an example provided for illustration. As one of skill in the art will recognize, the syntax of the path can vary based on the underlying platform or filesystem.

User ID column 440 includes user IDs identifying specific users or user accounts associated with the events and content items in event index 420. The user ID can be a unique identifier for identifying a user account or user profile. The user IDs in user ID column 440 can correspond to the user that caused the events identified in event column 442 and event ID column 444.

Each user has access to a root namespace, and any shared namespaces (shared collections) made available to the user through the root namespace. Thus, for content items in a root namespace, the user ID corresponds to the user that owns the private root namespace. For content items in a shared namespace, the user ID corresponds to a user from many users that have access to the content item. Event index 420 can record the user responsible for the event based on the user ID, which can be used to identify the user responsible for an event pertaining to a shared content item (e.g., shared namespace) accessible by multiple users.

FIG. 5A illustrates an example view 500 of a graphical user interface (GUI) 502 for presenting contact activity information (e.g., user contact event updates 420). GUI 502 can be presented on client device 150 during a session with content management system 110 and/or collaborative content management service 126. In this example, the user is authenticated for the session via user account 402 on content management system 110.

GUI 502 includes a graphical content area 504 containing content items and collaboration tools presented for user account 402. The information (e.g., content items and collaboration tools) presented in graphical content area 504 can be based on the content items and services associated with user account 402, as well as the preferences, configurations, and access permissions set for user account 402 at content management system 110. The content items and collaboration tools displayed in graphical content area 504 can also be based on where the user has navigated or what the user has accessed during the session. For example, the content items and collaboration tools displayed in graphical content area 504 can depend on whether the user is at a "Home" location or portal configured for user account 402, or whether the user has navigated to a specific page, project, file, directory, folder, etc., available to user account 402 at content management system 110 and/or collaborative content management service 126. In this example, graphical content area 504 depicts a "Home" location of user account 402, which can be a general or landing page, for example.

Graphical content area 504 includes various sections of content items and collaboration tools. For example, graphical content area 504 includes upload area 514 where the user can upload content items, create new content items (e.g., new folder, new document, new shared project, etc.), etc. Graphical content area 504 can also include one or more categories of content items such as recent items, starred items, unread items, open items, shared items, etc. In this example, graphical content area 504 includes section 512 of starred content items. Starred content items can include content items 512 (e.g., 512A, 512B, 512C, 512D, etc.) flagged or starred by the user.

The content items 512 can be depicted with their corresponding name (e.g., filename, folder name, project name, etc.), type (e.g., folder, document, image, movie, web page, etc.), content item icon (e.g., file type icon, application icon, etc.), and information about the content items. Example information can include dates (e.g., date added, date modified, etc.), read or access information, location information (e.g., directory or path), seen status, shared status (e.g., shared or unshared), membership information (e.g., number of members with access, name of members, etc.), content information (e.g., number of content items contained within the content item), events (e.g., edit events, add events, share events, etc.), event-related information (e.g., users associated with events, dates associated with events, etc.), and so forth. In some cases, content items 512 can also be depicted with an indication of users currently accessing or interacting with the content items. For example, content item 512A is depicted with an icon or profile of user contact 508A indicating that user contact 508A is currently accessing or interacting with content item 512A. Similarly, content item 512D is depicted with an icon or profile of user contacts 508B and 508C, indicating that those users are currently accessing or interacting with content item 512D.

Graphical content area 504 includes contacts feed 506 and contact activity section 510. Contacts feed 506 can display user contacts 508 (e.g., 508A, 508B, 508C, 508D, 508E, etc.), which represent profiles or users of contacts associated with user account 402. The user contacts 508 displayed can be based on current contact activity. For example, user contacts 508 can be contacts that are currently active (e.g., logged in) or available. User contacts 508 can be organized or prioritized within contacts feed 506 based on one or more factors, such as contact activity, contact relationship, prior communications and interactions with contacts, recency of contact activity (e.g., more recently active contacts are prioritized over less recently active contacts, the amount of contact activity (e.g., more active contacts may be prioritized or deprioritized), etc.

Figure 5B:
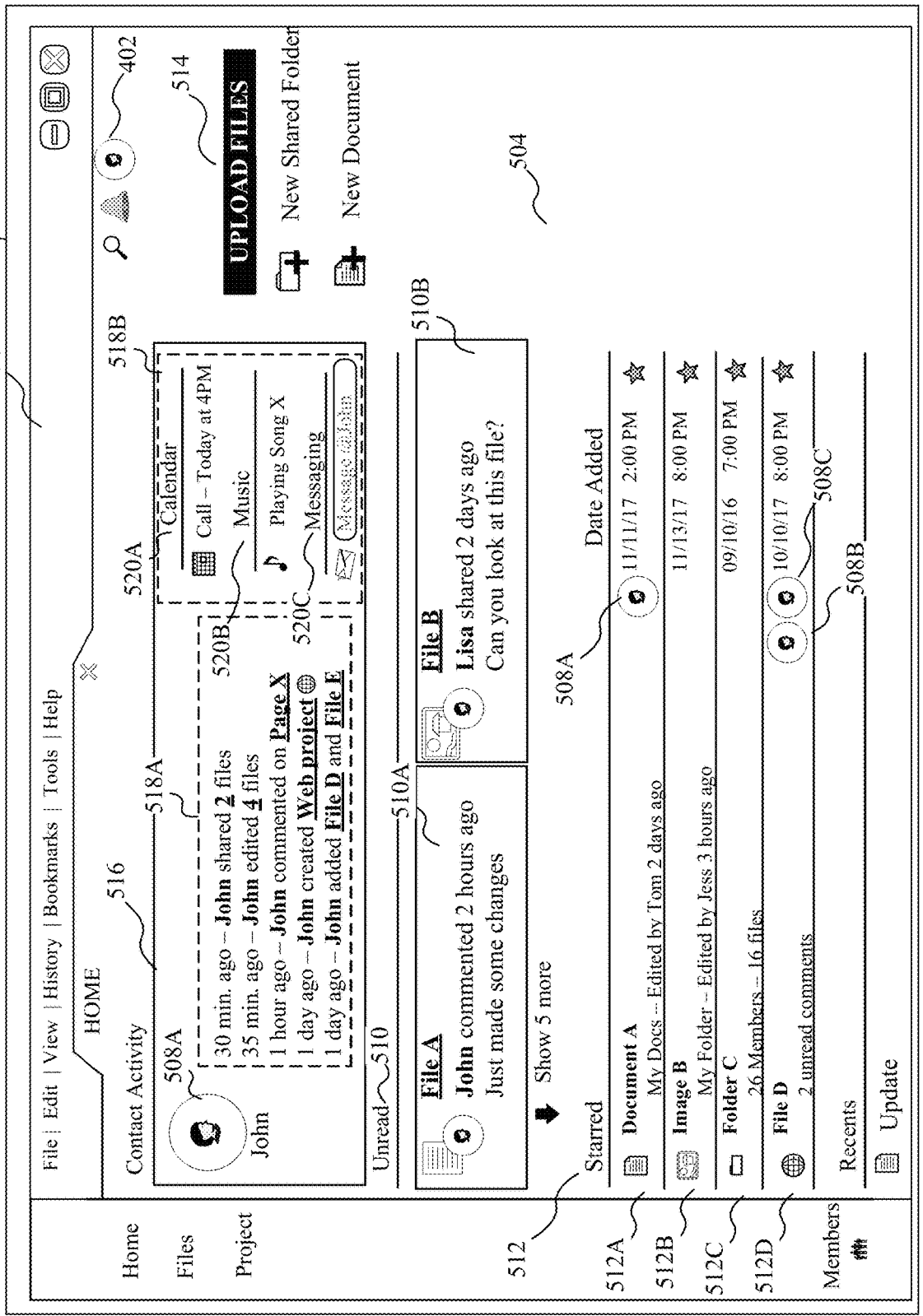
FIG. 5B illustrates an example expanded view of a graphical user interface presenting event updates and activity of a contact.

User contacts 508 can be presented along with contact information, such as contact profile images, contact names, contact addresses, contact location, contact status, contact activity details, etc. Moreover, user contacts 508 can be selected by the user. When the user selects a contact, graphical user interface 502 can present additional information about the selected contact (such as contact profile or activity information) or present an option to initiate a communication or collaboration with that contact (e.g., send a message, share a content item, start a collaborative project, etc. In some cases, a user can select a contact to update or modify contact activity and event information presented on graphical user interface 502 (e.g., Contacts feed 506, contact activity section 510). For example, the user can select contact 508A to limit contacts feed 506 to presenting information pertaining to contact 508A, as shown in FIG. 5B and further described below.

Contact activity section 510 can present events 510A, 510B for specific contacts in contacts feed 506. Events 510A, 510B can include various types of events, such as edit, post, read, share, add, comment, and other events. Moreover, the events presented can be events of a particular type, category, status, etc., or events associated with a specific user(s), content item(s), etc. In FIG. 5A, events 510A, 510B include unread events. However, events with other states can also be presented in addition to, or instead of, unread events, such as starred events, recent events (e.g., read and/or unread recent events), events pertaining to a particular project or content item, etc.

Events 510A, 510B can pertain to specific content items as previously explained, such as a file, a folder, a project, etc. Moreover, events 510A, 510B can be presented with the content item (e.g., File A, File B, Folder A, Project B, etc.) associated with the events or an indication of the content item associated with the events. The content item can be displayed with a link to the content item, a representation of the content item (e.g., content item icon), and/or other information about the content item, such as a content item name, type, location, status, seen state, share state, version, modification information, comments, etc.

Events 510A, 510B can include user contact event updates associated with specific content items, such as user contact event updates 420 generated via process 400 as shown in FIG. 4A. As previously described with respect to user contact event updates 420, the user contact event updates in events 510A, 510B can be system-generated updates as opposed to user-generated updates. For example, events 510A, 510B can include updates that are generated by content management system 110 without a user posting such updates for presentation at graphical user interface 502. Moreover, events 510A, 510B (including updates in events 510A, 510B) can be generated via a system for serving and querying event data (e.g., configuration 300). For example, events 510A, 510B can be generated in configuration 300 for serving and querying events data, based on query 330 and answer 332 as shown in FIG. 3.

Events 510A, 510B can be displayed as events occur or are detected. In some cases, events 510A, 510B can change or update on contact activity section 510 dynamically as user contacts 508 generate new events (e.g., interact with content items, collaborate with users, communicate with users, etc.). Events 510A, 510B can be presented based on status of the events, contacts, and/or content items. For example, events 510A, 510B may disappear once the seen state changes (e.g., the user views or accesses the content items) or may remain fixed even after a read status of the event or content item changes. For example, an event can remain fixed for a period of time or until a particular event is detected if the content item or event is determined to be important to the user.

In some cases, events 510A, 510B can be organized based on a priority, a time of event, a contact associated with the event, a content item associated with the event, etc. For example, events pertaining to a particular content item or contact may be displayed at the top and other events may be displayed below those events or even hidden or displayed less prominently. The number and type of events 510A, 510B presented in contact activity section 510 can vary. In some cases, contact activity section 510 can present a single or a limited set of events, while in other cases contact activity section 510 may present a much greater number of events or event information. The number of events and amount of information presented in contact activity section 510 may depend on one or more factors, such as user preferences, current activity, account privileges, etc.

FIG. 5B illustrates an example of GUI 502 presenting an expanded view 530 of contact activity information (e.g., user contact event updates 420) for a selected contact. Expanded view 530 shows a contact activity section 516 for a selected contact from contacts feed 506 in FIG. A, which in this example is user John (508A). Contact activity section 516 can be a focused or expanded view of information and activity for user contact 508A (John). In some cases, a user at GUI 502 can access expanded view 530 and specifically contact activity section 516 for user contact 508A (John) by selecting user contact 508A (John) from contacts feed 506 or events 510A, 510B in view 500 shown in FIG. 5A.

For example, if the user wants to drill-down on user contact 508A (John) or limit or focus the contact activity information to user contact 508A, the user can click or select the name or profile image of user contact 508A (John) from contacts feed 506 in FIG. 5A to update GUI 502 according to expanded view 530 showing contact activity section 516 for user contact 508A (John).

Contact activity section 516 contains information, events, and/or updates pertaining to user contact 508A (John). For example, contact activity section 516 can include user contact event updates 420 generated via process 400, as shown in FIGS. 4A and 4B. As another example, contact activity section 516 can include events generated via system configuration 300 for serving and querying event data, based on query 330 and answer 332 as shown in FIG. 3.

The information presented in contact activity section 516 can include information about user contact 508A, such as user, session, and profile information. For example, the information about user contact 508 presented in contact activity section 516 can include, without limitation, a name, a profile picture or image, contact information (e.g., email, telephone, instant messaging address, etc.), a status (e.g., busy, available, inactive, in a meeting, etc.), a location (e.g., a current geographic location, such as a city; a current browsing location, such as a particular web page; a current office; etc.), an activity (e.g., viewing a document, editing a file, browsing a page, commenting on a content item, messaging a user, accessing a client application, etc.), a profile message (e.g., a message set by John for display to other users), and so forth. The information about user contact 508A can thus provide the user at GUI 502 context, activity, and user information which can help the user when collaborating with John and enrich the user's collaborative experience.

Contact activity section 516 can also include a content activity portion 518A and an application activity portion 518B. Content activity portion 518A can present events generated by user contact 508A (John) involving content items that user account 402 has access to (e.g., is authorized to access), such as filtered events based on intersection 412 as described at step 408 of process 400 shown in FIG. 4A. For example, content activity portion 518A can display events by user John (user contact 508A), such as view events, edit events, share events, add events, delete events, comment events, post events, etc., pertaining to content items on content management system 110 (e.g., content items 202 stored on content storage 142) that user account 402 is authorized to access (e.g., shared content items, shared namespaces, etc.).

Content activity portion 518A can include, for the displayed events, information about such events, such as a description of the event, the name of a content item associated with the event, a link to the content item associated with the event, an icon or image corresponding to the content item associated with the event (e.g., a thumbnail depiction of the content item, an icon identifying a file type of the content item or an application for accessing the content item, a user-defined image of the content item, a preview image of the content item, etc.), a description of the content item associated with the event, a time of the event, the name of the user(s) that generated the event (e.g., John), etc.

For example, content activity portion 518A can display the following description of an event by John (user contact 508A): "1 hour ago—John commented on Page X". In this example, the name of the user associated with the event (i.e., John) and the name of the content item (i.e., Page X) can be highlighted or emphasized and can include a respective link associated with the user and the content item respectively. For example, the name "John" can include a link to access additional information about John, contact John, initiate a communication session with John (e.g., message John), access content items shared between John and user account 402, etc. Similarly, the content item name "Page X" can include a link to open the content item (i.e., Page X), a link to navigate to a location where the content item is stored, a link to open or view the comment on the content item provided by John in the event, a link to preview the content item, etc.

In some cases, content activity portion 518A can display one or more events individually or in a batch. For example, content activity portion 518A can present an individual event such as "John created Web project", or batch multiple events such as "John shared 2 files" or "John added File D and File E". Events can be batched based on a commonality, such as a common content item, a common event type, a common project, a common shared folder, a common time period, etc. For example, events of common event type, such as edit events, can be batched into a single event description of the multiple edit events. As another example, events associated with the same content item, such as events relating to File A, can be batched into a single event description of multiple events for File A. As yet another example, events associated with content items from a same collection or a same folder, such as events associated with content items in Folder B, can be batched into a single event description of multiple events pertaining to content items in Folder B.

Application activity portion 518B can present activity on the client device of user contact 508A and/or from applications on the client device of user contact 508A, such as current application activities, client device notifications, current services, user-device interactions, information obtained from applications at the client device, etc. For example, application activity portion 518B can display application activity 520A, 520B, 520C which identifies respective applications and activities and/or information from the respective applications.

To illustrate, application activity 520A can identify a calendar associated with user contact 508A (e.g., a calendar application at the client device of user contact 508A, a calendar of user contact 508A at content management system 110, etc.), and one or more entries in the calendar. For example, application activity 520A can display a calendar of user John (508A) and one or more entries in the calendar such as one or more tasks or meetings set in the calendar. The calendar information depicted in application activity 520A can present scheduling information associated with user contact 508A, which can provide the user at GUI 502 valuable information about John's (508A) schedule and planned activities.

In this example of application activity portion 518B, application activity 520B illustrates a music service and a music item playing at the client device of user contact 508A. For example, application activity 520B can indicate that John (508A) is listening to "Song X". Moreover, in this example, application activity 520C can display a messaging application available to user contact 508A (e.g., stored, running, or available on the client device of user contact 508A). The messaging application can be displayed with an input area or control where the user ag GUI 502 can send or receive messages to user contact 508A via the messaging application. For example, application activity 520C can include an interface element or plugin for the messaging application where the user at GUI 502 can send a message to John (508A) and interact with John. John can similarly respond and send messages to the user at GUI 502, which can be displayed in application activity 520C.

Application activity portion 518B can also present other applications, services, and/or activities associated with user contact 508A, as well as options allowing the user at GUI 502 to view information from those applications, services, and/or activities associated with user contact 508A, and/or interact with user contact 508A through those applications, services, and/or activities. For example, application activity portion 518B can present interface elements, widgets, plugins, controls, etc., for accessing information from applications, services, and/or activities associated with user contact 508A and interacting with user contact 508A on those applications, services, and/or activities. Non-limiting examples include email, games, website links, videos, etc.

Figure 6:
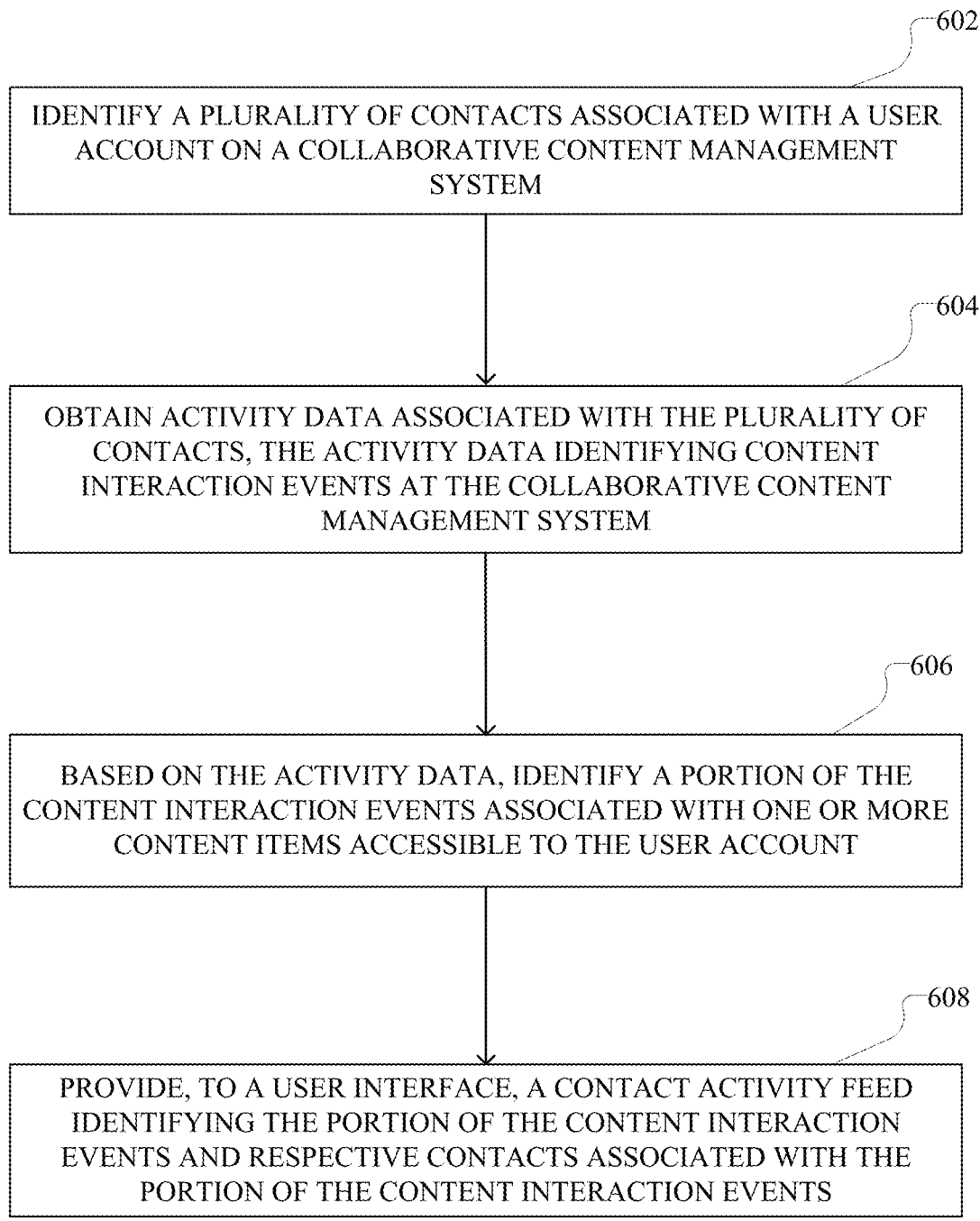
FIG. 6 illustrates an example method for providing contact and contact event information and updates to a user at a client device.
Figure 7:
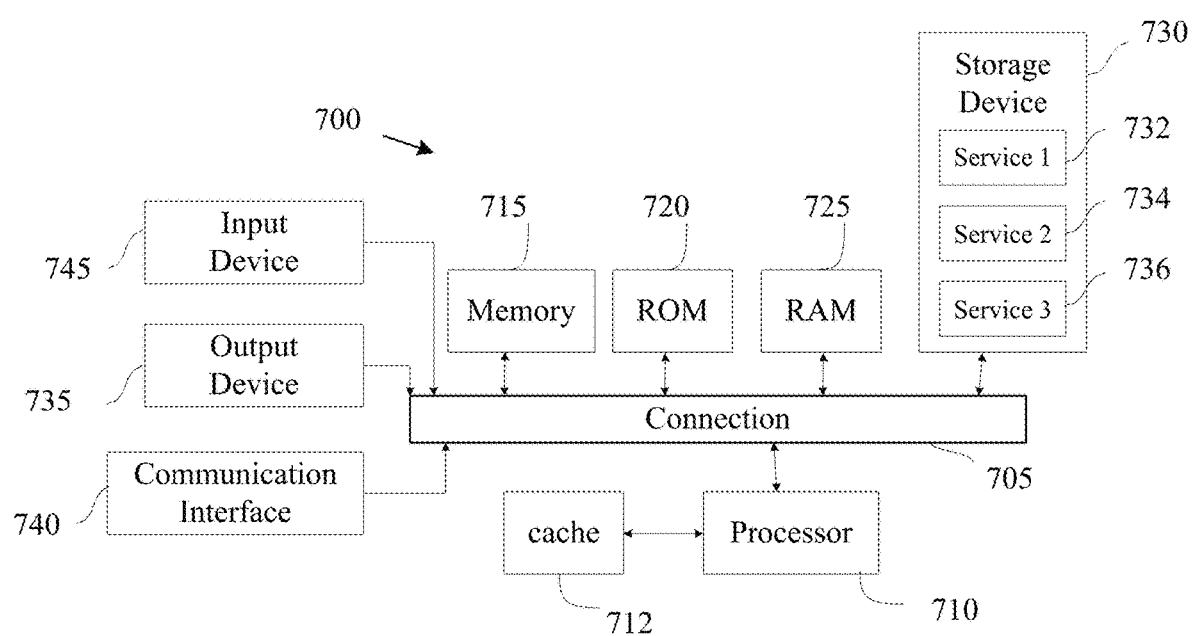
FIG. 7 illustrates an example system embodiment.

Having disclosed example system components and concepts, the disclosure now turns to the example method shown in FIG. 6. For the sake of clarity, the method is described with reference to client device 150, content management system 110, and collaborative content management system 130, as shown in FIGS. 1A and 1B, configured to perform the various steps in the method. The steps outlined herein are examples and can be implemented in any combination thereof, including combinations that exclude, add, or modify certain steps.

At step 602, collaborative content management system 130 identifies a plurality of contacts associated with a user account on collaborative content management system 130. The plurality of contacts can be associated with respective user accounts on collaborative content management system 130.

At step 604, collaborative content management system 130 obtains activity data associated with the plurality of contacts (e.g., events). The activity data can include content interaction events at collaborative content management system 130. The content interaction events can be generated by the plurality of contacts based on respective interactions with content items at collaborative content management system 130. The content interaction events can include, for example, add events, edit events, delete events, share events, post events, comment events, etc.

At step 606, based on the activity data, collaborative content management system 130 can identify a portion of the content interaction events associated with one or more content items accessible to the user account. The one or more content items accessible to the user account can be content items the user account is authorized to access at collaborative content management system 130 or content management system 110. For example, the content items can include content items shared with the user account, public content items, content items having an access permission for the user account, etc. Thus, the portion of the content interaction events can include events pertaining to the user account based on the user account's access to the content items associated with the events and the user account's relationship with the user that generated the events (i.e., the contacts of the user account).

At step 608, collaborative content management system 130 can provide, to a user interface on a client device (e.g., client device 150) associated with the user account, a contact activity feed (e.g., contacts feed 506, contact activity 516) identifying the portion of the content interaction events and respective contacts associated with the portion of the content interaction events. The contact activity feed can identify the respective contacts, the events in the portion of the content interaction events, the content items associated with the events, etc. The contact activity feed can also include user, content, and activity information for the user account based on the respective contacts and/or events. For example, the contact activity feed can include user account profiles or profile images of the respective contacts, names, contact information, event descriptions, content item descriptions, event updates, as well as other activity performed by one or more of the contacts.

In some examples, the plurality of contacts can be a subset of the contacts of the user account. For example, collaborative content management system 130 can identify the contacts of the user account and filter the contacts based on priorities, such as communication activity, user relationships, number of shared content items, number of common contacts, group membership, recency of activity, frequency of activity, user preferences, etc. The plurality of contacts can thus be a top N number of contacts selected based on the contact priorities. Collaborative content management system 130 can thus limit the activity data to events for the top N number of contacts and/or limit the events and contacts presented in the contact activity feed to the top N number of contacts. This can help avoid providing too much information to the user, such as too many contacts in the contacts feed or too many contact event updates. This example approach can also avoid presenting contact information and activity to the user that the user may not be interested in, such as contact information and activities corresponding to a low priority contact for the user.

The portion of the content interaction events can be filtered by content based on the content items associated with the content interaction events and the user account's access to those content items. For example, the events can be filtered to only include events pertaining to content items the user account has access to or is authorized to access. This way, the user account is not provided updates for events pertaining to content items that the user account does not have access to and may not have interest in. Accordingly, the filtered events can represent the intersection between the set of content items associated with the events and the set of content items the user account has access to or is authorized to access.

The portion of content interaction events can be presented at the user interface (e.g., graphical user interface 502) at client device 150. The presented events can be sanitized, grouped, filtered, and displayed in any manner, such as a chronological order, a prioritized order, an order based on status, an order based on preferences, a customized format, etc. The contact activity feed can interact with other applications to provide activity of contacts on other applications (e.g., calendar, email, streaming application, music application, messaging application, social media application, etc.).

FIG. 7 illustrates an example computing system architecture 700 wherein the components of the system are in communication with each other using a connection 705. Connection 705 can be a physical connection via a bus, or direct connection into processor 710 such as in a chipset architecture. Connection 705 can also be a virtual connection, networked connection, or logical connection.

In some embodiments 700 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 700 includes at least one processing unit (CPU or processor) 710 and a connection 705 that couples various system components including the system memory 715, such as read only memory (ROM) and random access memory (RAM) to the processor 710. The system 700 can include a cache of high-speed memory connected directly with, in close proximity to, or integrated as part of the processor 710.

The processor 710 can include any general purpose processor and a hardware service or software service, such as service 1 732, service 2 734, and service 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The description and drawings herein are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or any example term. Likewise, the disclosure is not limited to various embodiments given in this specification.

As used herein, claim language reciting "at least one of" a first item "and" a second item indicates that the first item, the second item, or both the first and second item satisfy the claim. For example, claim language reciting "at least one of A and B" indicates that either a set of A or B (e.g., A only or B only) or a set of A and B (e.g., both A and B) can satisfy the claim.

What is claimed is:

1. A method comprising:
   identifying user contact accounts associated with a user account on a collaborative content management system;
   identifying a first set of event identifiers in a first event index based on the identified user contact accounts, wherein each event identifier of the first set of event identifiers corresponds to one content interaction event related to at least one of the identified user contact accounts in the collaborative content management system;
   identifying a second set of event identifiers in a second event index based on a shared namespace identifier of the user account, wherein the shared namespace identifier defines an access permission for content of the user contact accounts in the collaborative content management system, wherein each event identifier of the second event index corresponds to one content interaction event by at least one of the user contact accounts;
   matching same event identifiers in the first set of event identifiers and the second set of event identifiers to identify a common set of event identifiers;
   obtaining content interaction events based on the common set of event identifiers, wherein each event of the obtained content interaction events corresponds to one content interaction event record in the collaborative content management system; and
   providing, to a user interface on a client device associated with the user account, a contact activity feed identifying the obtained content interaction events.

2. The method of claim 1, wherein identifying the user contact accounts comprises:
   calculating priorities for the user contact accounts based on a respective amount of activity between the user account and each user contact account; and
   based on the priorities, identifying a subset of the user contact accounts, the subset having one or more threshold priorities.

3. The method of claim 1, wherein the contact activity feed comprises a visual indication of one or more content items associated with the obtained content interaction events.

4. The method of claim 1, further comprising:
   grouping those of the obtained content interaction events that are associated with a same content item to yield an event grouping; and
   providing, to the user interface on the client device associated with the user account, an indication of the event grouping.

5. The method of claim 1, wherein providing the contact activity feed comprises providing an indication of a chronological order of the obtained content interaction events.

6. The method of claim 1, wherein the access permission comprises at least one of a read permission granting the user account read access to a content item or an edit permission granting the user account permission to edit the content item, wherein one or more content items associated with the obtained content interaction events comprise shared content items on the collaborative content management system.

7. The method of claim 1, wherein providing the contact activity feed comprises providing respective profile images associated with the respective contacts.

8. The method of claim 1, further comprising:
providing, to the user interface on the client device associated with the user account, respective contact activity updates associated with at least one of the user contact accounts, the respective contact activity updates identifying new content interaction events associated with at least one content item for which the user account has the access permission on the collaborative content management system.

9. The method of claim 1, wherein providing the contact activity feed comprises:
causing the user interface to display, via the contact activity feed, a respective profile image of a contact from the respective user contact accounts and activity information associated with the contact, the activity information comprising a description of a subset of content interaction events associated with the contact, the subset excluding one or more content interaction events involving one or more respective content items for which the user account does not have the access permission on the collaborative content management system, the description identifying, for each content interaction event, at least one of an event time, a respective content item associated with the content interaction event, an event type, or one or more links associated with the content interaction event.

10. The method of claim 9, further comprising:
causing the user interface to display, via the contact activity feed, an indication of a respective interaction between the contact and one or more applications, the indication identifying the one or more applications and the respective interaction between the contact and the one or more applications;
receiving, from the client device, a request to interact with the contact via an application from the one or more applications;
causing the client device to initiate an interaction between the user account and the contact via the application; and
causing the client device to display the interaction via the user interface.

11. The method of claim 1, wherein the second set of event identifiers is associated with a subset of all content items that the user account has access to.

12. The method of claim 1, wherein the first event index and the second event index are traversed in parallel.

13. The method of claim 1, wherein the first index comprises an index of key-value pairs based on user identifiers and the second index comprises an index of key-value pairs based on a namespace identifier.

14. A non-transitory computer-readable medium comprising:
instructions stored therein which, when executed by one or more processors, cause the one or more processors to:
identify user contact accounts associated with a user account on a collaborative content management system;
identify a first set of event identifiers in a first event index based on the identified user contact accounts, wherein each event identifier of the first set of event identifiers corresponds to one content interaction event related to at least one of the identified user contact accounts in the collaborative content management system;
identify a second set of event identifiers in a second event index based on a shared namespace identifier of the user account, wherein the shared namespace identifier defines an access permission for content of the user contact accounts in the collaborative content management system, wherein each event identifier of the second event index corresponds to one content interaction event by at least one of the user contact accounts;
match same event identifiers in the first set of event identifiers and the second set of event identifiers to identify a common set of event identifiers;
obtain content interaction events based on the common set of event identifiers, wherein each event of the obtained content interaction events corresponds to one content interaction event record in the collaborative content management system; and
provide, to a user interface on a client device associated with the user account, a contact activity feed identifying the obtained content interaction events.

15. The non-transitory computer-readable medium of claim 14, wherein identifying the user contact accounts comprises:
calculating priorities for the user contact accounts based on a respective amount of activity between the user account and each contact; and
based on the priorities, identifying a subset of the user contact accounts, the subset having one or more threshold priorities.

16. The non-transitory computer-readable medium of claim 14, wherein the contact activity feed presents one or more content items associated with the common obtained content interaction events, and wherein the one or more content items comprise shared content items shared with the user account on the collaborative content management system.

17. The non-transitory computer-readable medium of claim 14, wherein providing the contact activity feed comprises:
providing respective profile images associated with the respective user contact accounts; and
providing respective contact activity updates associated with at least one of the user contact accounts, the respective contact activity updates identifying new content interaction events associated with at least one content item the user account is authorized to access at the collaborative content management system.

18. The non-transitory computer-readable medium of claim 14, wherein providing the contact activity feed comprises:
causing the user interface to display, via the contact activity feed, a respective profile image of a contact from the respective user contact accounts and activity information associated with the contact, the activity information comprising a description of a subset of content interaction events associated with the contact, the activity information excluding one or more content interaction events associated with the contact involving a respective interaction between the contact and one or more respective content items for which the user account does not have access permission on the collaborative content management system, the description identifying, for each content interaction event, at least one of an event time, a respective content item associated with the content interaction event, an event type, or one or more links associated with the content interaction event.

19. The non-transitory computer readable medium of claim 18, storing additional instructions which, when executed by the one or more processors, cause the one or more processors to:
cause a first application on the client device to display, via the user interface, the contact activity feed and an indication of a respective interaction between the contact and one or more applications, the indication identifying the one or more applications and the respective interaction between the contact and one or more applications;
receive, from the client device, a request to interact with the contact via a second application from the one or more applications;
cause the client device to initiate an interaction between the user account and the contact via the second application; and
cause the first application on the client device to display the interaction via the user interface.

20. A system comprising:
one or more processors; and
at least one computer-readable storage medium having stored therein instructions which, when executed by the one or more processors, cause the system to:
identify user contact accounts associated with a user account on a collaborative content management system;
obtain a first set of interactions in a first event index based on the identified user contact accounts, wherein each interaction of the first set of interactions corresponds to one content interaction event related to at least one of the identified user contact accounts in the collaborative content management system;
determine a second set of interactions in a second event index based on a shared namespace identifier of the user account, wherein the shared namespace identifier defines an access permission for content of the user contact accounts in the collaborative content management system, wherein each event identifier of the second event index corresponds to one content interaction event by at least one of the user contact accounts;
match same event identifiers in the first set of interactions and the second set of interactions to identify common interactions from the first set of interactions;
obtain interactions based on the common interactions, wherein each interaction of the obtained interactions corresponds to one content interaction event record in the collaborative content management system; and
provide, to a user interface on a client device associated with the user account, a contact activity feed identifying the obtained interactions.

21. The system of claim 20, wherein providing the contact activity feed comprises:
providing respective contact activity updates associated with at least one of the respective user contact accounts, the respective contact activity updates identifying new interactions between the respective user contact accounts and a subset of the content items.

22. The system of claim 20, wherein providing the contact activity feed comprises:
causing the user interface to display, via the contact activity feed, a respective profile image of a contact from the respective user contact accounts and activity information associated with the contact, the activity information comprising a description of one or more of the first set of interactions associated with the contact, the description identifying, for each interaction, at least one of a time of interaction, a respective content item associated with the interaction, a type of interaction, and one or more links associated with the interaction.

23. The system of claim 22, the at least one computer-readable storage medium storing additional instructions which, when executed by the one or more processors, cause the system to:
cause the user interface to display, via the contact activity feed, an indication of a respective interaction between the contact and one or more applications, the indication identifying the one or more applications and the respective interaction between the contact and one or more applications;
receive, from the client device, a request to interact with the contact via an application from the one or more applications;
cause the client device to initiate a collaboration session between the user account and the contact via the application; and
cause the client device to display activity from the collaboration session via the user interface.

* * * * *